(12) United States Patent
Abe et al.

(10) Patent No.: US 7,962,007 B2
(45) Date of Patent: Jun. 14, 2011

(54) SIGNAL PROCESSING DEVICE AND SIGNAL PROCESSING METHOD

(75) Inventors: Mototsugu Abe, Tokyo (JP); Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1464 days.

(21) Appl. No.: 09/843,629

(22) Filed: Apr. 26, 2001

(65) Prior Publication Data

US 2002/0015105 A1 Feb. 7, 2002

(30) Foreign Application Priority Data

Apr. 27, 2000 (JP) ............................ P2000-132918

(51) Int. Cl.
*H04N 5/80* (2006.01)
(52) U.S. Cl. ...................... 386/249; 386/250; 386/251
(58) Field of Classification Search .................. 348/571;
386/96, 125, 126, 52, 55, 54, 46, 83, 95,
386/109, 110; 725/37, 42, 9, 39
See application file for complete search history.

(56) References Cited

U.S. PATENT DOCUMENTS

| | | | | |
|---|---|---|---|---|
| 4,685,003 | A | * | 8/1987 | Westland ........................ 386/52 |
| 5,103,341 | A | * | 4/1992 | Ulrich et al. .................. 359/657 |
| 5,343,251 | A | * | 8/1994 | Nafeh ........................... 348/571 |
| 5,774,664 | A | * | 6/1998 | Hidary et al. ................. 725/110 |
| 5,907,350 | A | | 5/1999 | Nemirofsky |
| 5,930,446 | A | * | 7/1999 | Kanda ............................ 386/52 |
| 5,966,495 | A | * | 10/1999 | Takahashi et al. ............. 386/68 |
| 6,100,941 | A | * | 8/2000 | Dimitrova et al. ............ 348/700 |

(Continued)

FOREIGN PATENT DOCUMENTS

JP 05-205344 8/1993

(Continued)

OTHER PUBLICATIONS

Tetsuo Wada, Development of the commercial broadcast checker, Institute of Image Information and Television Engineers technical report, Japan, The Institute of Image Information and Television Engineers, May 20, 1998, vol. 22, No. 25, p. 55-59 (ISSN 1342-6893).

(Continued)

*Primary Examiner* — Jamie Atala
(74) *Attorney, Agent, or Firm* — SNR Denton US LLP

(57) ABSTRACT

A signal processing device and a signal processing method can accurately detect CMs out of broadcast signals and also be used for storing, accessing, retrieving and viewing/listening to CMs. CM detecting section (202) detects CM sections out of a broadcast signal. CM extracting section (201) extracts the signal part for the CM section from the broadcast signal on the basis of the CM section detection signal (202*a*) of the CM detecting section (202) and CM characteristics extracting section (203) extracts the characteristic value of the CM. Then, CM recording section (205) records the signal of the CM section and the characteristic value. CM index generating section (206) generates CM index information by using the signal of the CM section and the characteristic value and characteristics comparing section (204) determines agreement/disagreement of CMs. CM viewing section (208) displays CM retrieval information and reproduce the CM signal from the CM recording scanning (205) in response to the instruction of the user (209). As a result, the user (209) can view, listen to and retrieve the desired CM.

53 Claims, 26 Drawing Sheets

U.S. PATENT DOCUMENTS

| | | | |
|---|---|---|---|
| 6,147,940 A * | 11/2000 | Yankowski | 369/30.06 |
| 6,169,542 B1 * | 1/2001 | Hooks et al. | 715/719 |
| 6,285,818 B1 | 9/2001 | Suito et al. | |
| 6,698,020 B1 * | 2/2004 | Zigmond et al. | 725/34 |
| 6,959,143 B2 * | 10/2005 | Dupuis et al. | 386/125 |
| 7,088,909 B1 * | 8/2006 | Wordemann | 386/69 |
| 2002/0006268 A1 * | 1/2002 | Chotoku et al. | 386/83 |
| 2003/0028433 A1 * | 2/2003 | Merriman et al. | 705/14 |
| 2005/0028200 A1 * | 2/2005 | Sardera | 725/42 |

FOREIGN PATENT DOCUMENTS

| | | |
|---|---|---|
| JP | 09-247612 | 9/1997 |
| JP | 10-136301 | 8/1998 |
| JP | 10-224722 | 11/1998 |
| JP | 11-102550 | 4/1999 |
| JP | 2000-354213 | 12/2000 |
| WO | WO 9608921 A1 | 3/1996 |
| WO | 96/33561 | 10/1996 |

OTHER PUBLICATIONS

Katsunao Takahashi, Dynamic image search mode using the image crest, the Information Processing Society of Japan memoir, Japan, Information Processing Society of Japan, Dec. 4, 1998, vol. 98, No. 111, p. 15-20 (ISSN 0919-6072).

Nobuyuki Tada, Study of the commercial detection method of the TV broadcast, Institute of Image Information and Television Engineers technical report, Japan, The Institute of Image Information and Television Engineers, Mar. 14, 1997, vol. 21, No. 23, p. 19-23 (ISSN 1342-6893).

A Japanese Office Action dated Mar. 3, 2009 issued in connection with counterpart Japanese Patent Application No. 2000-132918.

A European Search Report dated Apr. 24, 2009 issued in connection with counterpart European Patent Application No. 01 110 435.3-1522.

* cited by examiner

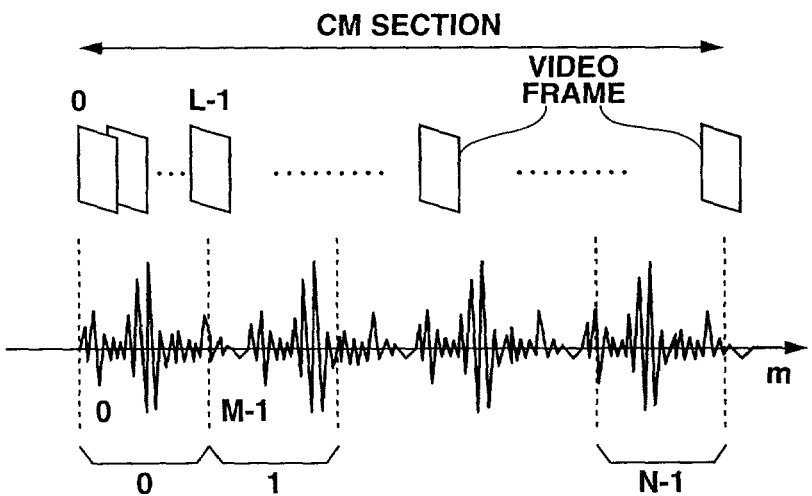
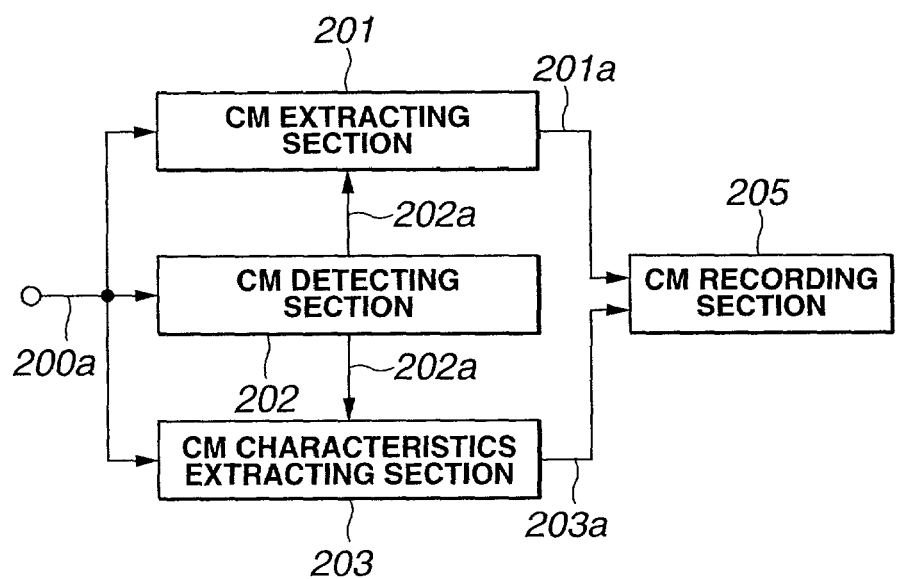
FIG.5

| ITEM | SIGN | UNIT | REQUIREMENT EXAMPLE (19a) | ADDITIONAL REQUIREMENT EXAMPLE (20a) | JUDGEMENT EXAMPLE (21a) |
|---|---|---|---|---|---|
| START TIME | Ts | hour/minute/second | 1:23'45 | 1:23'45 | 1:23'45 |
| LENGTH (SOUNDED LENGTH) | Tw | second | 14.63 | 14.63 | 14.63 |
| FRONT BREAK LENGTH | $Q_1$ | ms | - | 300.0 | 300.0 |
| REAR BREAK LENGTH | $Q_2$ | ms | - | 300.0 | 300.0 |
| FRONT BREAK MINIMAL AMPLITUDE | $Q_3$ | NB | - | 0.00015 | 0.00015 |
| REAR BREAK MINIMAL AMPLITUDE | $Q_4$ | NB | - | 0.00020 | 0.00020 |
| LEFT-RIGHT CORRELATION VALUE | $Q_5$ | - | - | 0.934 | 0.934 |
| AVERAGE AMPLITUDE | $Q_6$ | NB | - | 0.010 | 0.010 |
| NUMBER OF CUTS | $Q_7$ | number | - | 9 | 9 |
| BROADCASTING MODE | $Q_8$ | - | - | 1 | 1 |
| NUMBER OF ADJACENT CANDIDATES | $Q_9$ | number | - | 2 | 2 |
| FRONT SPECTRUM DIFFERENTIAL ENERGY | $Q_{10}$ | - | - | 0.41 | 0.41 |
| REAR SPECTRUM DIFFERENTIAL ENERGY | $Q_{11}$ | - | - | 0.63 | 0.63 |
| SCORE | R | - | - | - | 1.80 |
| RESULT OF SCORE JUDGEMENT | Z | - | - | - | 1 |

NB: THE VALUE RELATING TO THE AMPLITUDE OF THE AUDIO SIGNAL IS EXPRESSED IN TERMS OF RATIO RELATIVE TO THE MAXIMUM AMPLITUDE

FIG.20

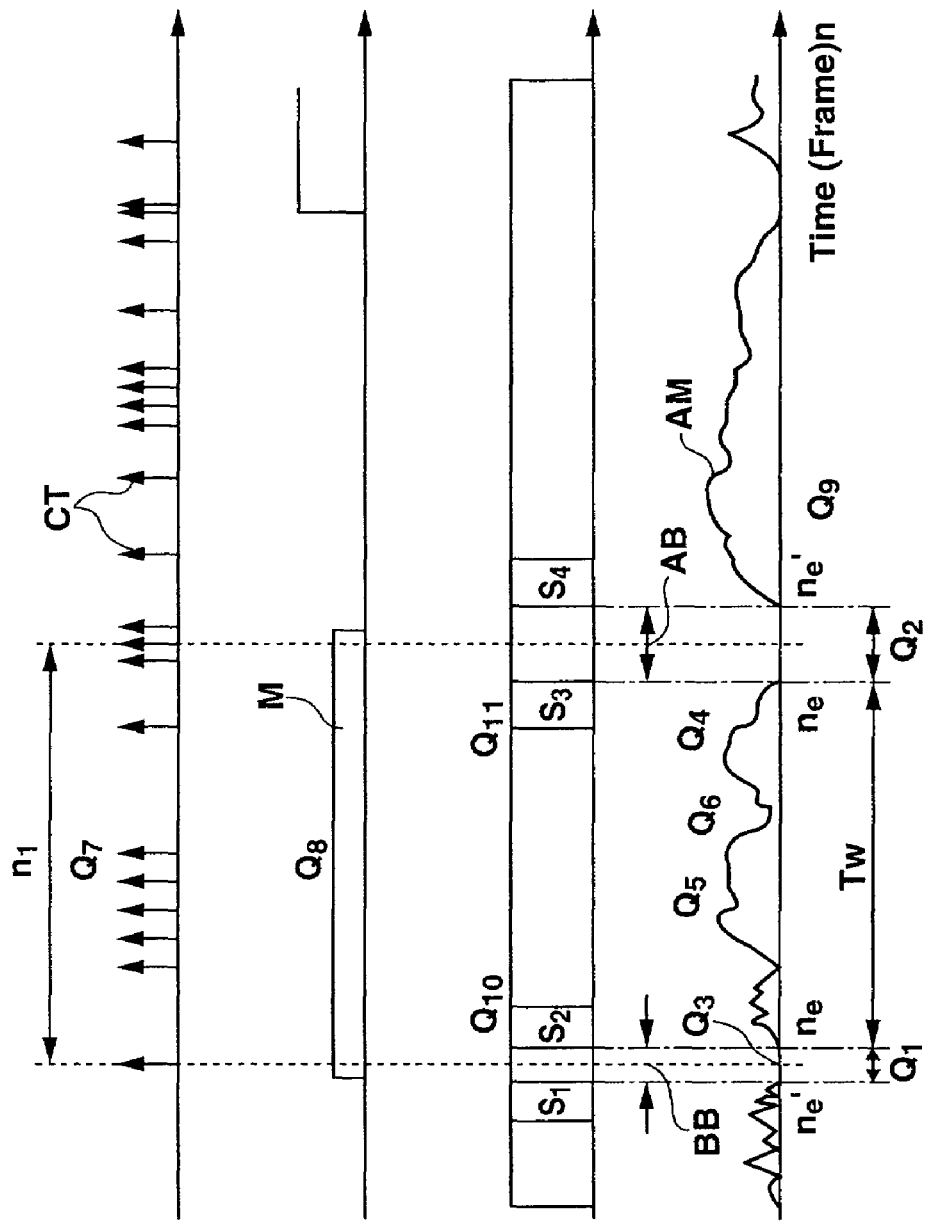

| ITEM | SIGN | UNIT | REQUIREMENT EXAMPLE (19a) | ADDITIONAL REQUIREMENT EXAMPLE (20a) | JUDGEMENT EXAMPLE (21a) |
|---|---|---|---|---|---|
| PRESENCE OR ABSENCE OF VOICE | $Q_{12}$ | - | - | 1 | 1 |
| PRESENCE OR ABSENCE OF MUSIC | $Q_{13}$ | - | - | 1 | 1 |
| TIME SLOT PROBABILITY | $Q_{14}$ | - | - | 0.15 | 0.15 |
| PROGRAM CATEGORY PROBABILITY | $Q_{15}$ | - | - | 0.1 | 0.1 |

FIG.29

SIGNAL PROCESSING DEVICE AND SIGNAL PROCESSING METHOD

RELATED APPLICATION DATA

The present application claims priority to Japanese Application No. P2000-132918 filed Apr. 27, 2000, which application is incorporated herein by reference to the extent permitted by law.

BACKGROUND OF THE INVENTION

This invention is applied to an audio/video recording/reproduction apparatus. More particularly, the present invention relates to a signal processing device and a signal processing method that can be conveniently used for storing, viewing/listening to and/or retrieving commercial messages added to a television broadcast program.

Conventionally, television and radio programs are normally broadcast with commercial messages (to be referred to simply as CMs hereinafter) provided by one or more than one commercial companies and/or organizations and inserted into the program with few exceptions that may charge a subscription fee.

Some of the viewers of such a program may feel that the CMs are not wanted while other may appreciate them as necessary and direct sources of commercial information particularly when they present famous actors and/or interesting scenes.

However, while the channels and the time slots of television and radio programs to be broadcast can be known in advance by referring to a published time schedule, it is not easy to know in advance the channel and the time slot of a particular CM. Therefore, it may be highly convenient to those viewers/listeners who want to view/listen to particular CMs if the CMs that are broadcast and/or to be broadcast are stored at a particular site so that any viewer/listener who wants to view/listen to a particular CM may access, retrieve and view/listen to it at any time he or she wants.

Japanese Patent Applications Laid-Open Publication Nos. 8-317342, 3-158086 and 3-2622872 proposes techniques for detecting CMs out of broadcast signals so that a viewer/listener can view/listen to a program by skipping the CMs in the program. However, none of the above cited patent documents describe a technique for storing accessing, retrieving and viewing/listening to CMs.

Meanwhile, Japanese Patent Application Laid-Open Publication No. 10-224724 describes a technique of detecting information accompanying CMs, storing the information and replaying a same CM for once. However, the disclosed technique cannot be used to store, access, retrieve and view/listen to CMs. Additionally, the use of the disclosed technique is very limited because it cannot discriminate a stereophonic program and a CM that is broadcast in a stereo mode, although CMs are often broadcast in a stereo mode.

Therefore, there is a strong demand for a technique that can accurately detect CMs out of broadcast signals and also be used for storing, accessing, retrieving and viewing/listening to CMs.

BRIEF SUMMARY OF THE INVENTION

In view of the above identified circumstances, it is therefore the object of the present invention to provide a signal processing device and a signal processing method that can accurately detect CMs out of broadcast signals and also be used for storing, accessing, retrieving and viewing/listening to CMs.

According to the invention, the above object is achieved by providing a signal processing device comprising a first signal section detecting means for detecting a first signal section out of an input signal including at least the first signal section and the remaining signal section on a time division basis, a first signal extracting means for extracting the signal of the first signal section out of the input signal according to the result of the detection of the first signal section and a recording means for recording the extracted first signal.

In another aspect of the invention, there is also provided a signal processing method comprising steps of detecting a first signal section out of an input signal containing at least the first signal section and the remaining signal section on a time division basis, extracting the signal of the first signal section out of the input signal according to the result of the detection of the first signal section and recording the extracted first signal.

Thus, according to the invention, the first signal is detected out of the input signal and recorded and therefore, it is now possible to separate and sort out the first signal from the remaining signal section of the input signal. Additionally, according to the invention, it is easy to view, remove and/or detect the first signal because some or all of the characteristic values characterizing the detected first signal can be recorded with the first signal itself. Still additionally, according to the invention, it is possible to extract and display the index information representing the first signal so that the first signal can be viewed and retrieved with ease. Furthermore, according to the invention, any duplicative parts of the recorded first signal can be removed to improve the recording efficiency and eliminate the possible waste of time of viewing a same signal for a number of times. Finally, according to the invention, the first signal can be used to detect a signal that is partly identical with or similar to the first signal.

In short, according to the invention, since the first signal section is detected out of an input signal and then extracted and recorded according to the result of the detection of the first signal section, it is now possible to detect a CM as the first signal out of a broadcast signal, or the input signal, so that the CM can be stored, viewed/listened to and/or retrieved without problem.

BRIEF DESCRIPTION OF THE DRAWINGS

FIG. 4 is a schematic illustration of discretization of an input audio signal and an input video signal and processing frames to be used for the signals;

FIG. 5 is a schematic block diagram of a subset of the embodiment including the CM detecting section, the CM extracting section, the CM characteristics extracting section and the CM recording section;

FIG. 20 is a schematic illustration of a first possible CM candidate table that can be used in the CM detecting section of the embodiment;

FIG. 21 is a schematic illustration of the operation of computationally determining characteristic values of the additional requirement determining computer of the CM detecting section of the embodiment;

FIG. 29 is a schematic illustration of a second possible CM candidate table (extended part only) that can be used in the CM detecting section of the embodiment.

DETAILED DESCRIPTION OF THE INVENTION

Now, the present invention will be described in greater detail by referring to the accompanying drawings that illustrate a preferred embodiment of the invention.

Figure 1:
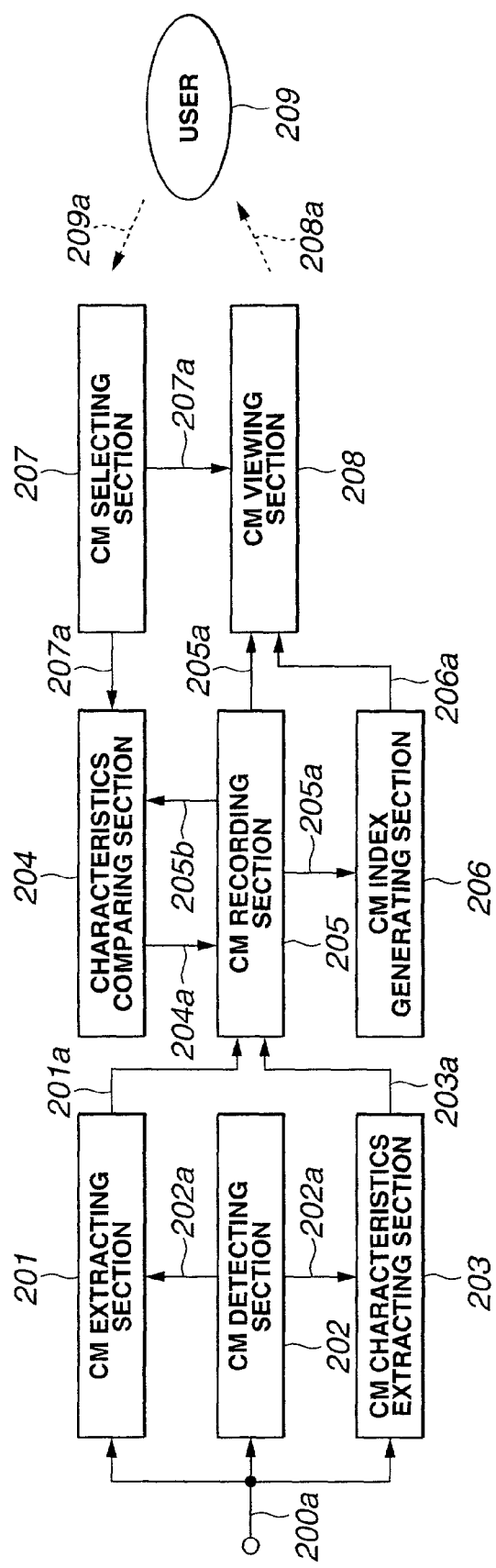
FIG. 1 is a schematic block diagram of a preferred embodiment of broadcast signal processing device according to the invention.

FIG. 1 is a schematic block diagram of a preferred embodiment of broadcast signal processing device according to the invention.

Referring to FIG. 1, the broadcast signal processing device is adapted to receive an input signal $200a$ that can contain a video signal, an audio signal, a control signal and a program guide signal. The input signal $200a$ may be a signal that is received by way of a ground wave broadcasting system, a satellite broadcasting system, a cable broadcasting system or a telephone network or reproduced from some other recording device that has recorded the signal in advance. The video signal and the audio signal take a major part of the broadcast signal and contain the signals of a program itself and one or more than one CMs. The control signal includes information on the broadcasting mode, the time slot of broadcasting the program, the frequency of the wave or the channel to be used for the transmission of the signal. The program guide signal contains data related to the video signal and the audio signal when the signals are received in the case of digital broadcasting or by way of a telephone network. While it is assumed that the signals are those of a single broadcast program, the present invention is also applicable to signals that are input simultaneously by way of a plurality of channels.

Of the broadcast signal processing device shown in FIG. 1, the CM detecting section 202 detects at least the start time of each CM (to be referred to as CM start time hereinafter) and the length of the CM section (to be referred to as CM length hereinafter from the input signal $200a$ containing the video signal, audio signal, control signal and the program guide signal and outputs a CM detection signal $202a$ indicating the CM start times and the CM lengths. The operation of the CM detecting section 202 will be described in greater detail hereinafter along with the CM start times and the CM lengths. The CM detection signal $202a$ detected by the CM detecting section 202 is then sent to the CM extracting section 201 and the CM characteristics extracting section.

The CM extracting section 201 extracts signal $201a$ that corresponds to the CM sections out of the input signal $202a$ on the basis of the CM detection signal $202a$ supplied from the CM detecting section 202. More specifically, the CM extracting section 201 extracts the signal sections corresponding to the CM sections as defined respectively by the CM start times and the CM lengths indicated by the CM detection signal $202a$ fed from the CM detecting section 202 and outputs CM part signals corresponding to the respective CM sections and containing video signals, audio signals, control signals and program guide signals respectively. The CM part signals $201a$ are sent to the CM recording section 205. Since the CM detection signal $202a$ from the CM detecting section 202 is delayed relative to the input signal $200a$ by the time period required for the detecting operation, the CM extracting section 201 is adapted to absorb the delay by using a temporary storage such as a magnetic recording device that is internally or externally provided.

The CM recording section 205 is in fact a device for recording and reproducing signals by using a magnetic tape, a magnetic disc, an opto-magnetic disc, a recordable optical disc and/or a semiconductor memory. Upon receiving the CM part signals $201a$ (including the video signals, the audio signals, the control signals and the program guide signals corresponding to the CM sections), the CM recording section 205 records the CM part signals $201a$.

Figure 2:
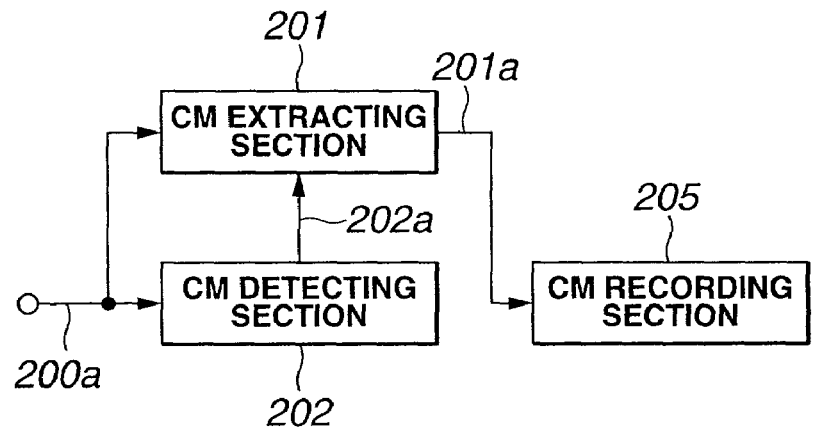
FIG. 2 is a schematic block diagram of a subset of the embodiment including the CM detecting section, the CM extracting section and the CM recording section.
Figure 3:
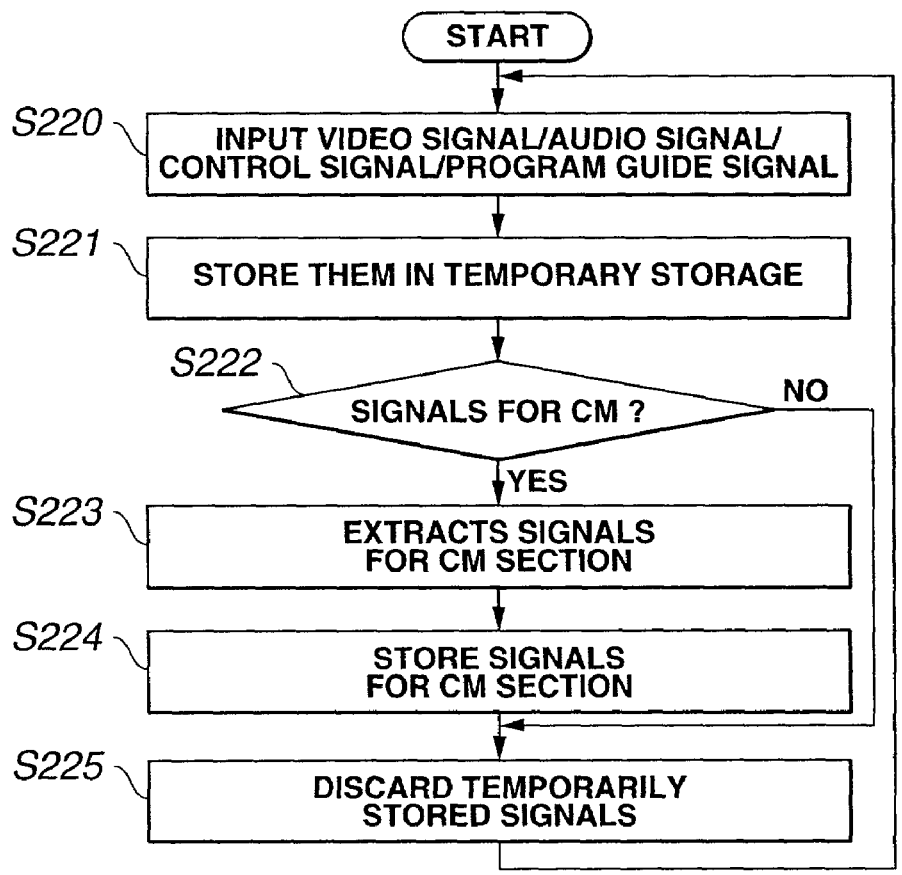
FIG. 3 is a flow chart of the operation of the subset of FIG. 2.

FIG. 2 is a schematic block diagram of a subset of the embodiment including only the CM extracting section 201, the CM recording section 202 and the CM recording section 205 and FIG. 3 is a flow chart of the operation of the subset of FIG. 2.

Referring to FIG. 3, as the video signals, the audio signals, the control signals and the program guide signals of the input signal 200a are sequentially input to the subset in step S220, the input signal 200a is stored in the internal or external temporary storage by the CM extracting section 201 in step S221.

At the same time, the CM detecting section 202 of the above subset detects the CM start times and the CM lengths of the CM sections. More specifically, the CM detecting section 202 detects each CM section out of the input signal 200a in Step S222 and then processing operation proceeds to Step S223 when it is determined that the detected section is a CM section but to Step S225 when it is determined that the detected section is not a CM section.

In Step S223, the CM extracting section 201 extracts the signal 201a containing the video signal, the audio signal, the control signal and the program guide signal of the detected CM section. Then, in Step S224, the CM recording section 205 stores the extracted signal.

When the processing operation proceeds to Step S225, the signals temporarily stored by the CM extracting section 201 is discarded and the processing operation returns to Step S220 to repeat the above steps.

Referring back to FIG. 1, the CM characteristics extracting section 203 extracts CM characteristics out of the input signal 200a on the basis of the CM detection signal 202a fed from the CM detecting section 202. More specifically, the CM characteristics extracting section 203 extracts the characteristic values (representing some or all of the characteristics as CM as will be described hereinafter) of each of the signal parts contained in the CM detection signal 202a fed from the CM detecting section 202 and corresponding to the CM sections as defined by the CM start times and the CM lengths and outputs the characteristic values 203a to the CM recording section 205. Note that, since the CM detection signal 202a fed from the CM detecting section 202 is delayed relative to the input signal 200a by the time period required for the detecting operation, the CM characteristics extracting section 203 is adapted to absorb the delay by using a temporary storage such as a magnetic recording device that is internally or externally provided. The temporary storage of the CM characteristics extracting section 203 may share the temporary storage of the CM extracting section 201.

The characteristic values for characterizing each of the CMs are extracted from the video signal and the audio signal. Part or all of the physical values of each CM including the amplitude characterizing value, the spectrum characterizing value, the linear prediction coefficient, the brightness histogram, the color histogram, the average luminance the luminance difference energy, the number of cut changes and the number of each cut change may be used for the purpose of the invention. These characteristic values shows a pattern that is identical to a CM and but different from that of some other CM so that they can be used to characterize the CM.

In the following description, it is assumed that the input audio signal and the input video signal are discretized and the input audio signal is expressed by S[m] as shown in (b) of FIG. 4, where m=0, 1, ..., M−1, representing discretized time periods, M being the discrete time corresponding to the frame being processed. Also assume that the input video signal is expressed by I[x, y; l], where l=0, 1, ..., L−1, representing the video fame of the input image, L being the number of video frames corresponding to the processing frame, x= 0, ..., X−1, representing the pixel number in the horizontal direction, X being the horizontal image size, and y=0, ..., X−1, representing the pixel number in the vertical direction, Y being the vertical image size. Note that the processing frame is the processing unit having a predetermined time length, which is typically 250 ms. The number of frames corresponding to the length of a CM section is expressed by N as shown in (c) of FIG. 4.

Now, each characteristic value will be discussed below.

Firstly, the amplitude characteristic value A[n] of processing frame n is the value of the mean square of the audio signals in frame n and obtained by means of formula (1) below.

$$A[n] = \frac{1}{M}\sum_{m=0}^{M-1} S^2[m+nM] \qquad (1)$$

The vector of the amplitude characteristic value obtained for all the frames of the CM section is expressed by A=(A[0], A[1], ..., A[N−1]).

The spectrum characteristic value F[k; n] of processing frame n is the average spectrum in frame n and obtained by means of formula (2) below;

$$F[k;n] = \left|\sum_{m=0}^{M-1} S[m]e^{-2\pi jmk/M}\right|^2, \qquad (2)$$

where k =0, ..., K, representing the discretized frequency, K being the maximum frequency to be treated. The computation is carried out by typically using FFT or linear prediction analysis. The operation of discretization of frequency can be reduced to a linear one or non-linear one that uses octave as unit of operation by rediscretizing k in formula (2). The vector of the spectrum characteristic value obtained for all the frames of the CM section is expressed by F=(F[0;0], F[1;0], ..., F[K−1;N−1]).

The linear prediction coefficient P[k;n] of processing frame n can be computationally determined by using an LPC algorithm such as the one shown in Linear Prediction of Speech (Markel et al., Springer Verag, 1978). k=0, ..., K−1 denotes the number for the linear prediction coefficient and K denotes the degree of prediction. The vector of the linear prediction coefficient obtained for all the frames of the CM section is expressed by P=(P[0;0], P[1;0], ..., P[K−1]).

The luminance histogram $H_1[q;n]$ of processing frame n is the luminance histogram of the video signals of frame n. q= 0, ..., Q−1 denotes the index number of the luminance slot and Q denotes the number of slots of the histogram.

The color histogram $H_c[q;n]$ of processing frame n is the intensity histogram of each color of the signal of frame n. q= 0, ..., Q−1 denotes the index number of the color and intensity slot and Q denotes the number of slots of the histogram.

The vector of the luminance histogram and that of the color histogram formed for all the frames of the CM section are expressed respectively by $H_1$=($H_1$[0;0], $H_1$[1;0], ..., $H_1$[Q−1;N−1]) and $H_c$=($H_c$[0;0], $H_c$[1;0], ..., $H_c$[Q−1;N−1]).

The average luminance B[n] of processing frame n is that of the video signals in processing frame n and deterinined by formula (3) below.

$$B[n] = \frac{1}{XYL}\sum_{l=0}^{L-1}\sum_{x=0}^{X-1}\sum_{y=0}^{Y-1} I[x, y; l] \qquad (3)$$

The vector of the average luminance B[n] obtained for all the frames of the CM section is expressed by B=(B[0], B[1], . . . , B[N−1]).

The luminance difference energy D[n] of processing frame n is the inter-pixel difference energy of adjacent video frames and typically determined by formula (4) below.

$$D[n] = \frac{1}{XY(L-1)} \sum_{l=1}^{L-1} \sum_{x=0}^{X-1} \sum_{y=0}^{Y-1} (I[x, y; l] - I[x, y; l-1])^2 \quad (4)$$

The vector of the luminance difference energy obtained for all the frames of the CM section is expressed by D=(D[0], D[1], . . . , D[N−1]). The inter-pixel difference may be replaced by the difference in the average luminance of all the images or the inter-block difference, using blocks of 8×8 pixels or 16×16 pixels for horizontal direction×vertical direction.

The number of cut changes C[n] of processing frame n is the number of the frames where the pixel difference energy between adjacent video frames exceeds a predetermined threshold value in the processing frame n and determined by formula (5) below;

$$C[n] = \text{Count}_{l=1}^{L-1} \left( \sum_{x=0}^{X-1} \sum_{y=0}^{Y-1} (I[x, y; l] - I[x, y; l-1])^2 \geq D_{thsd} \right) \quad (5)$$

where $\text{Count}^b_a$ (f) is a function for showing the number of times where the requirement of evaluation formula f is satisfied and $D_{thsd}$ is a predetermined threshold value for the luminance difference energy. The vector of the number of cut changes obtained for all the frames of the CM section is expressed by C=(C[0], C[1], . . . , C[N−1]).

The time of each cut change can be determined in terms of frame number n that satisfies the requirement of C[n]>0. The number of cut changes for all the CM section can be determined as the total sum of C[n].

The CM characteristics extracting section 203 detects all or part of the above described characteristic values for each CM section. Therefore, the characteristic values that characterizes the CM section is expressed by vector V defined by formula (6) below.

$$V=(A, F, P, H_1, H_c, B, D, C) \quad (6)$$

The characteristic vector V can also be defined by formula (7) below;

$$V=(V[0], V[1], \ldots, V[N-1]) \quad (7)$$

where V[n] is the vector of the characteristic values of processing frame n and defined by formula (8) below.

$$V=(A[n], F[k;n], P[k;n], H_1[n], H_c[n], B[n], D[n], C[n]) \quad (8)$$

The characteristic values described above and extracted by the CM characteristics extracting section 203 are then stored in the CM recording section 205 with the signal of the CM section (including video signal/audio signal/control signal/program guide signal) for the CM section extracted by the CM extracting section 201, which is described earlier.

Figure 6:
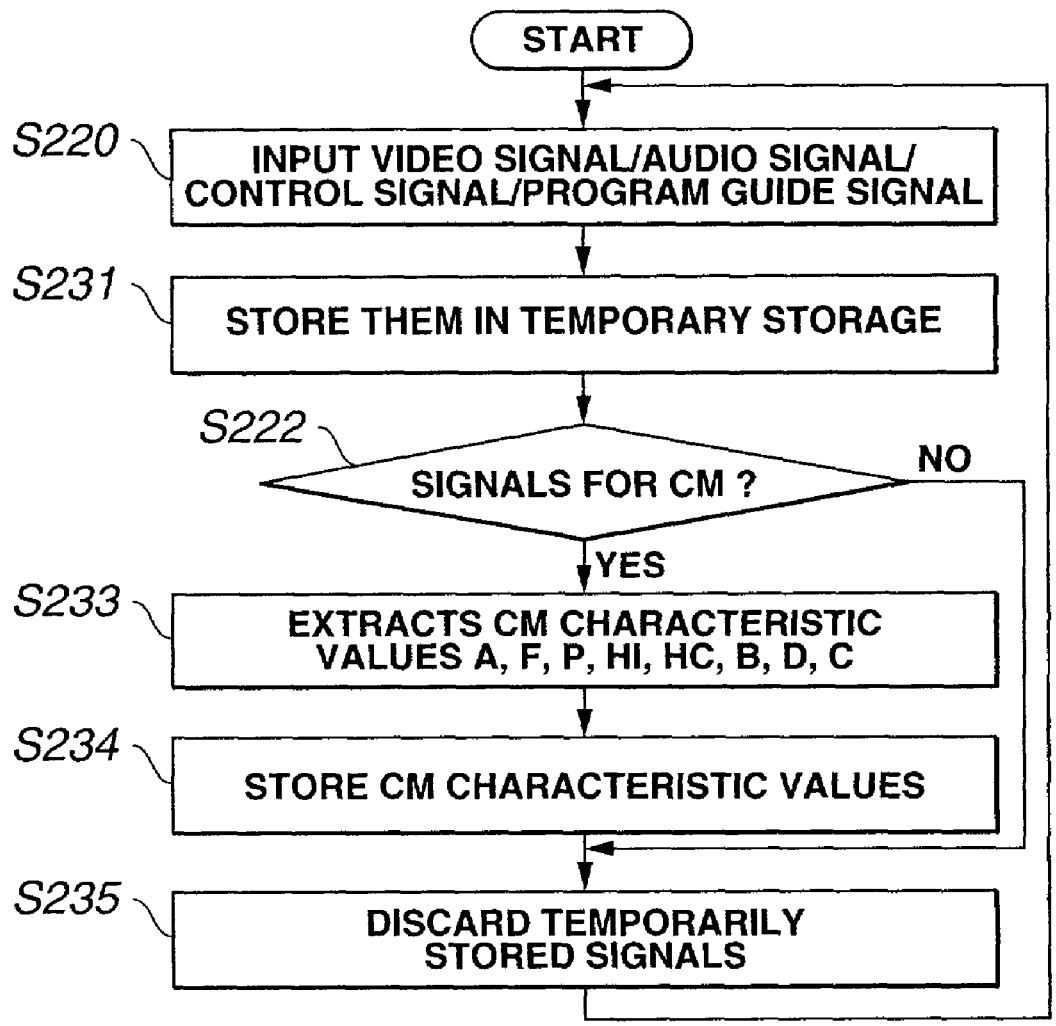
FIG. 6 is a flow chart of the operation of the subset of FIG. 5.

FIG. 5 is a schematic block diagram of a subset of the embodiment including the CM extracting section 201, the CM detecting section 202, the CM characteristics extracting section 203 and the CM recording section 205 and FIG. 6 is a flow chart of the operation of the subset of FIG. 5. Note that the steps of the flow chart of FIG. 6 that are same as those of the flow chart of FIG. 3 are denoted respectively by the same step numbers and will not be described any further. Therefore, only the steps relating to the CM characteristics extracting section 203 will be described below.

Referring to FIG. 6 illustrating the operation of the subset of FIG. 5, after Step S220, where the video signal, the audio signal, the control signal and the program guide signal of the input signal 200a are sequentially input, the processing operation proceeds to Step S231, where the input signal 200a is temporarily stored in the internal or external temporary storage of the CM characteristics extracting section 203.

At the same time, the start time of the CM section and the time length of the CM section are detected by the CM detecting section 202 and the processing operation proceeds to Step S233 if it is determined in Step S222 that the detected section is a CM section, whereas the processing operation proceeds to Step S235 if it is determined in Step S222 that the detected section is not a CM section.

As for the subset of FIG. 5, as the processing operation proceeds to Step S232, the CM characteristics extracting section 203 extracts characteristic values of the CM section out of the video signal, the audio signal, the control signal and the program guide signal of the CM section and the extracted characteristic values are stored in the CM recording section 205 in Step S234.

Then, the processing operation proceeds to Step S235, where the signals temporarily stored in the CM characteristics extracting section 203 are discarded, and returns to Step S220 to repeats the above steps.

Returning to FIG. 1, the CM part signals 201a (including the video signals, the audio signals, the control signals and the program guide signals) of the CM section stored in the CM recording section 205 and the characteristic values 203a of the CM section are read out of the CM recording section 205 and sent to the CM index generating section 206 and the CM viewing section 208.

The CM index generating section 206 generates information to be used as indexes for the CM on the basis of the CM part signals 201a and the characteristic values 203a fed from the CM recording section 205 and sends the information 206a (to be referred to as CM index information hereinafter) to the CM viewing section 208.

The CM index information 206 a may typically be information showing the starting image, the cut point image, the cut point video image, the starting sound and/or the ending sound of the CM, which will be described below.

Now, the CM index information 206a will be discussed below.

Firstly, the starting point image is the image at the very start of the CM section and used as part of the index information.

The cut point image is the image of a cut point of the CM section and used as part of the index information. Since a cut point belongs to a processing frame whose characteristic value C[n] is greater than 0, the image of the time is used. While a CM section normally has a plurality of cut points, only a single image that may be the image of the first cut point or that of the last cut point as selected according to a predetermined criterion is used as the cut point image.

The cut point video image is obtained by connecting the images of the cut points of the CM section to produce a video image, which is then used as part of the index information. Since a CM section normally has a plurality of cut points, a short video image is generated by connecting all the images of all the cut points.

The starting sound is a sound that lasts for a predetermined period of time, e.g., 2 seconds, from the very start of the CM section and used as part of the index information. Since CMs often have a short characteristic sound at the very start thereof, it is useful to utilize the starting sound as a CM index.

The ending sound is a sound that lasts for a predetermined period of time, e.g., 2 seconds, until the very end of the CM section and used as part of the index information. Since CMs often have a sound and an image specific to a particular product or a particular company or some other organization, it is useful to utilize the ending sound as a CM index.

The CM part signals 201a and the characteristic values 203a of the CM section from the CM recording section 205 (to be collectively referred to as recording section reproduced signal 205a whenever appropriate hereinafter) are supplied to the CM viewing section 208 along with the CM index information 206a from the CM index generating section 206. The CM viewing section 208 includes a display processor 801 and a display section 802.

The display section 802 typically comprises a display device such as a CRT (cathode ray tube) or a liquid crystal monitor and a loudspeaker and is adapted to provide the user with images and sounds.

The display processor 801 of the CM viewing section 208 is also fed with the user selected information 207a generated by the CM selecting section 207 according to the selecting instruction 209a of the user 209. As will be described hereinafter, the user 209 will view (208a) the CM index images, or the images and the icons, displayed on the display section 802 and issues a selecting instruction 209a to the CM index images, or the images and the icons, displayed on the display section 802 typically by means of a pointing device which may be a mouse, a remote commander or a touch panel. Then, the CM selecting section 207 generates user selection information 207a corresponding to the user's selecting instruction 209a. The generated user selection information 207a is sent to the display processor 801 of the CM viewing section 208.

The display processor 801 receives the CM index information 206a and the recording section reproduced signal 205a (particularly, video/audio signal sections) along with the user selection information 207a from the CM selecting section 207 and operates to display information to the user. The display processor 801 may typically comprise a processor and software.

Figure 7:
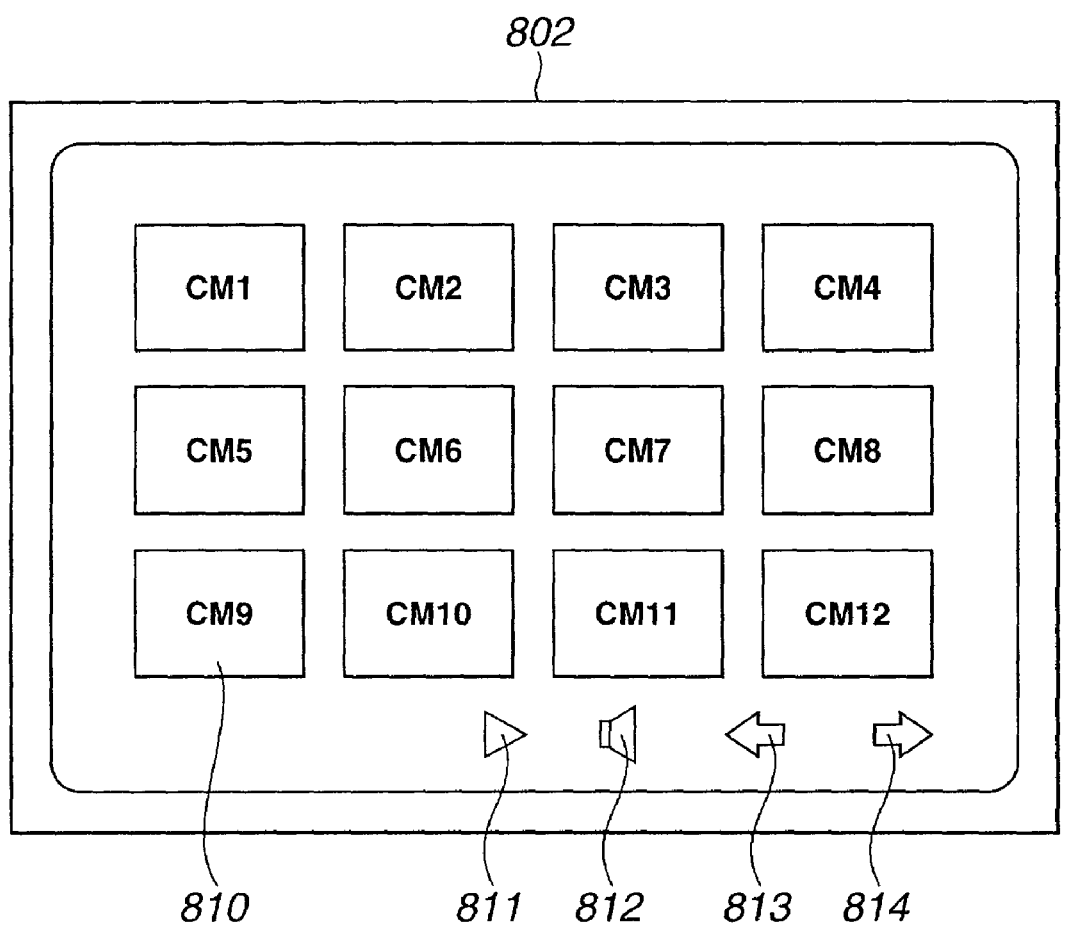
FIG. 7 is a schematic illustration of an image that can be displayed on the display screen of the display section of the embodiment.

Now, the operation of the display processor 801 will be discussed below by referring to FIG. 7 showing a typical image of the display section 802.

The display processor 801 firstly arranges CM index images, or video images 810, on a plurality of CMs according to the CM index information 206a typically as a single scene and displays it on the display section 802 as shown in FIG. 7. Each of the CM index images, or the video images 810, may be the starting point image or the cut point video image of the corresponding CM. If the number of CMs (the CM index images or the video images 810) is large, they may be arranged in two or more than two scenes. The display processor 801 also arranges icons 811 through 814 to be used by the user to input his or her instructions to the CM selecting section 207 in a scene along with the CM index images or the video images 810 on the display section 802. In the instance of FIG. 7, a total of twelve CM index images or the video images 810 are displayed in a single scene along with a CM reproduction icon 811, a sound reproduction icon 812, a preceding page icon 813 and a succeeding page icon 814.

When a scene as shown in FIG. 7 is displayed and the display processor 801 receives user selection information 207a from the CM selecting section 207, the display processor 801 changes the display according to the user selection information 207a. More specifically, if the user 209 selects one or more than one CM index images or the video images by way of the CM selecting section 207, the display processor 801 may highlight the selected CM index images or the video images 810.

Additionally, when a scene as shown in FIG. 7 is displayed and the user 209 selects one of the icons by way of the CM selecting section 207, the display processor 801 carries out a processing operation that corresponds to the selected icon. If, for example, the CM reproduction icon 811 is selected by the user selection information 207a, the display processor 801 reproduces the image and the sound of the CM that is already selected from the CM index images or the video images 810. If the sound reproduction icon 812 is specifically selected by the user selection information 207a, the display processor 801 reproduces the starting sound, the ending sound or the entire sound of the CM. If the preceding page icon 813 is selected by the user selection information 207a, the display processor 801 displays the CM index images or the video images 810 of the immediately preceding page on the display screen. If, on the other hand, the succeeding page icon 814 is selected by the user selection information 207a, the display processor 801 displays the CM index images or the video images 810 of the immediately succeeding page (that are not viewed by the user) on the display screen.

Figure 8:
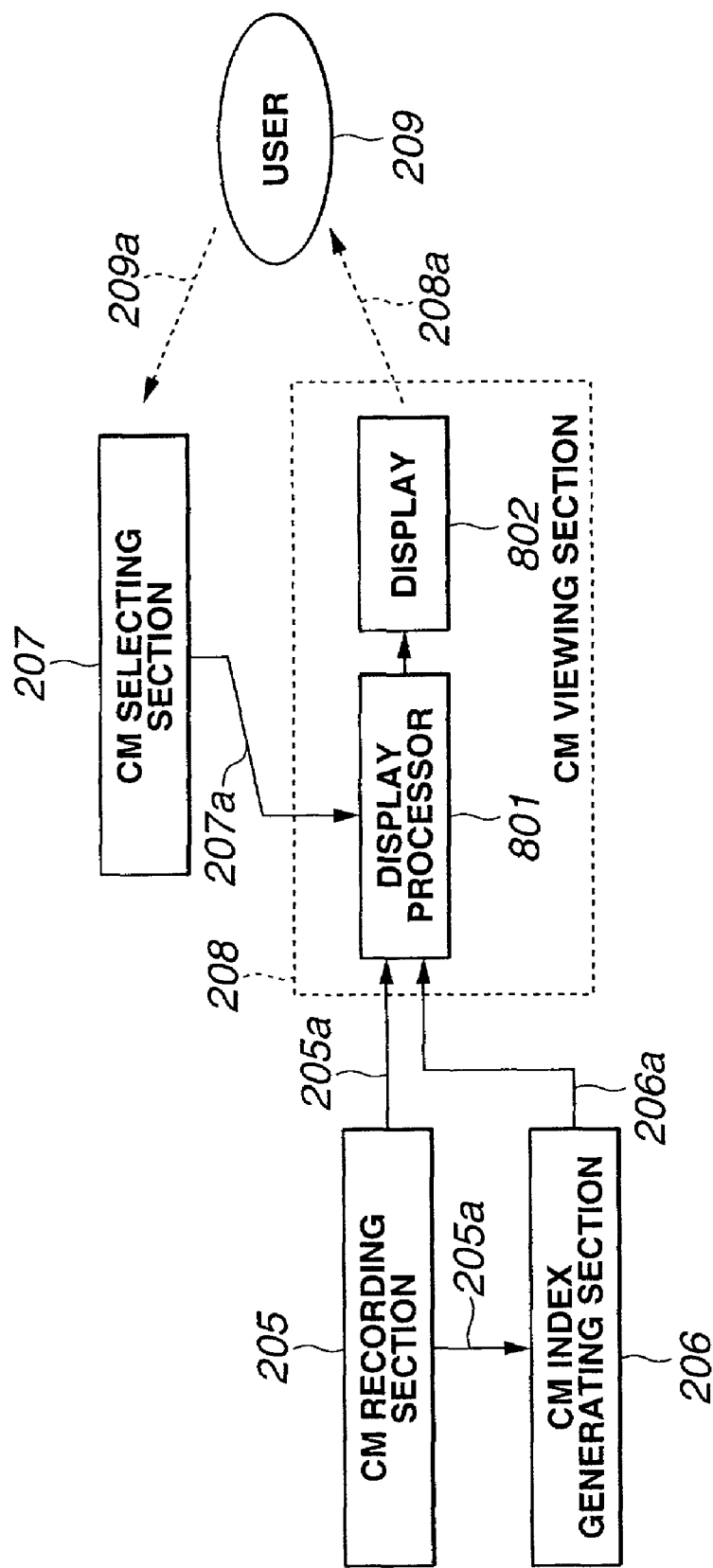
FIG. 8 is a schematic block diagram of a subset of the embodiment including the CM recording section, the CM index generating section, the CM viewing section and the CM selecting section.
Figure 9:
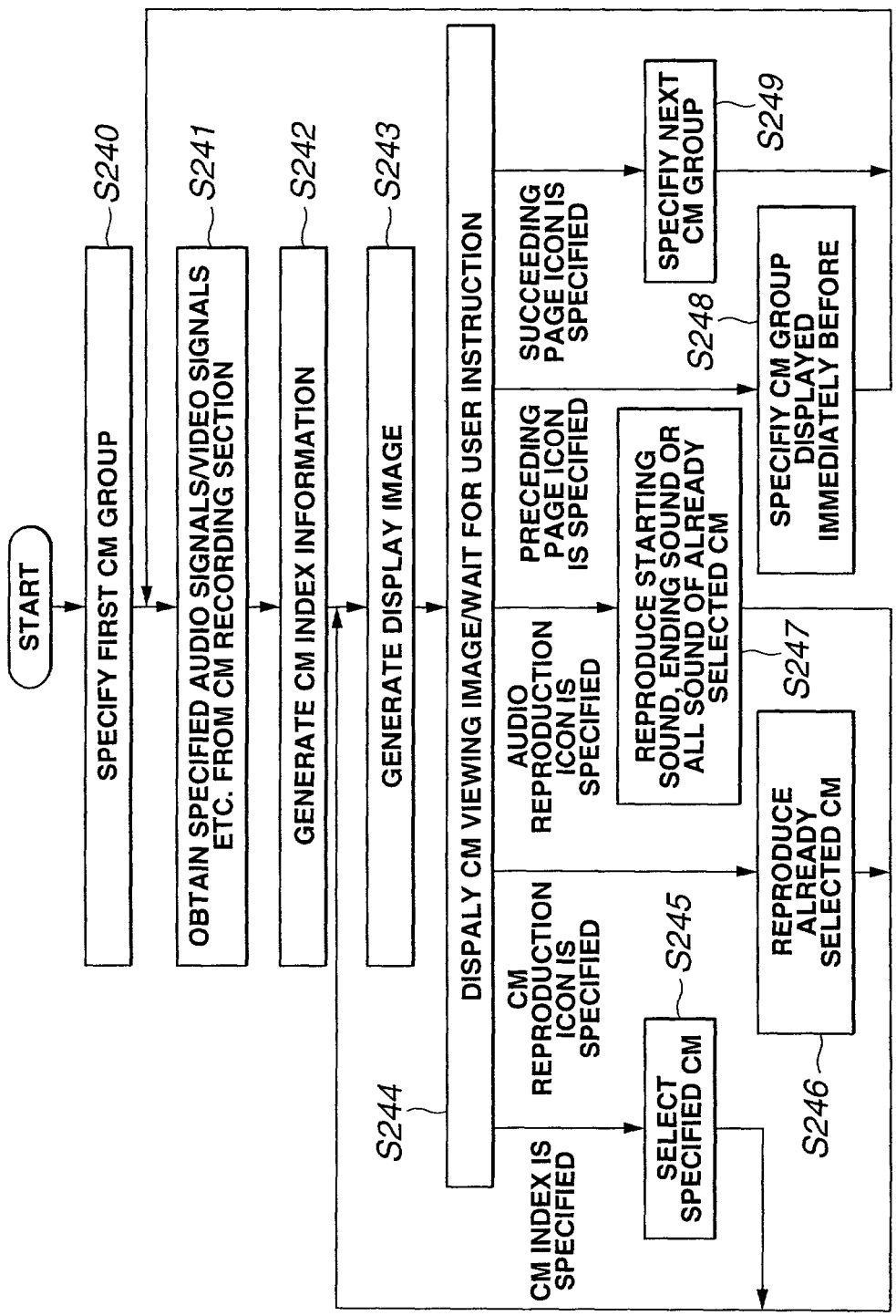
FIG. 9 is a flow chart of the operation of the subset of FIG. 8.

FIG. 8 is a schematic block diagram of a subset of the embodiment including the CM recording section 205, the CM index generating section 206, the CM viewing section 208 and the CM selecting section 207. FIG. 9 is a flow chart of the operation of the subset of FIG. 8, that of the CM viewing section 208 in particular.

Referring to FIG. 9, the CM viewing section 208 specifies the CMs of the first page in Step S240 and obtains the video signals/audio signals of the CMs of the first page in Step S241. Then, CM index information 206a is generated in Step S242 by the CM index generating section 206.

Subsequently, in Step S243, the display processor 801 of the CM viewing section 208 generates a scene to be displayed on the display screen according to the CM index information 206a and drives the display section 802 to display the scene. Then, in Step S244, the display processor 801 waits for the input of a user instruction (user selection information 207a), while displaying the scene.

If the user selection information 207a generated by the CM selecting section 207 according to the input of the instruction of the user 209 specifies a CM index, the display processor 801 selects the CM index image or the video image 810 specified by the user selecting information 207a in Step S245. Then, the display processor 801 regenerates the scene highlighting the CM index image or the video image 810 and causes the display section 802 to display the highlighted scene as in Step S243 and subsequently waits for the input of an instruction by the user 209 as in Step S244.

If the user selection information 207a specifies the CM reproduction icon 811, the display processor 801 reproduces in the CM recording section 205, the video signal and the audio signal of the CM corresponding to the CM index image or the video image 810 already specified by the user selection information 207a, in Step S246. Then, the display processor 801 regenerates the scene corresponding to the reproduced video signal and causes the display section 802 to display the scene as in Step S243 and subsequently waits for the input of an instruction by the user 209 as in Step S244.

If the user selection information 207a specifies the sound reproduction icon 812, the display processor 801 reproduces in the CM recording section 205, the audio signal of the starting sound, the ending sound or all the sound of the CM corresponding to the CM index image or the video image 810 already specified by the user selection information 207a, in Step S247. Then, the display processor 801 drives the loudspeaker to output the sound of the reproduced audio signal as in Step S243 and subsequently waits for the input of an instruction by the user 209 as in Step S244.

If the user selection information 207a specifies the preceding page icon 813, the display processor 801 reproduces in the CM recording section 205, the video signals and the audio signals of the CMs corresponding to the CM index images or the video images 810 of the immediately preceding page, in Step S248. Then, the display processor 801 drives the display section 802 to display the images corresponding to the reproduced video signals as in Step S243 and subsequently waits for the input of an instruction by the user 209 as in Step S244.

Finally, if the user selection information 207a specifies the succeeding page icon 814, the display processor 801 reproduces in the CM recording section 205, the video signals and the audio signals of the CMs corresponding to the CM index images or the video images 810 of the immediately succeeding page, in Step S249. Then, the display processor 801 drives the display section 802 to display the images corresponding to the reproduced video signals as in Step S243 and subsequently waits for the input of an instruction by the user 209 as in Step S244.

The above steps will then be repeated appropriately.

Returning to FIG. 1, the characteristic vector V of each CM recorded in the CM recording section 205 is sent to the characteristics comparing section 204 as signal 205b.

The characteristics comparing section 204 reads out the characteristic vector V of each CM recorded in the CM recording section 205 by means of a reading control signal 204a. The characteristics comparing section 204 determines by comparison if the CM is the right CM or not by means of the characteristic vector $V_i$ of the CM read out from the CM recording section 205. Note that "i" denotes the index (the variable of index) discriminating the individual CMs. The characteristics comparing section 204 compares the characteristic vectors $V_i$ and $V_j$ of two CMs in a manner as shown below.

Firstly, it carries out computations for an evaluation function J(i,j), using formula (9) below.

$$J(i; j) = |V_i - V_j|^2 = \sum_{n=0}^{N-1} |V_i[n] - V_j[n]|^2 \quad (9)$$

Subsequently, it compares J(i,j) with a predetermined threshold value $J_{thsd}$ and determines to be same if J(i,j) is lower than $J_{thsd}$ and to be different if J(i,j) is not lower than $J_{thsd}$. The characteristics comparing section 204 carries out the comparing operation for all the CMs stored in the CM recording section 205 and removes either one of the two CMs that are determined to be same from the CM recording section 205. As a result, all the duplicate signals of CMs stored in the CM recording section 205 will be removed.

Figure 10:
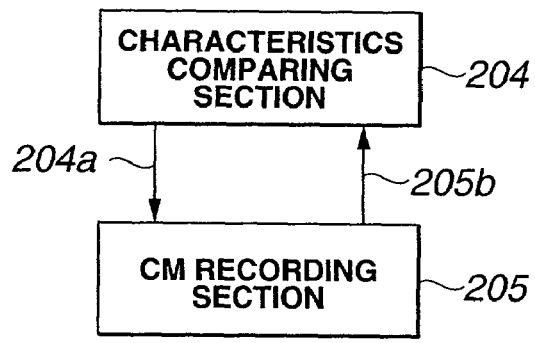
FIG. 10 is a schematic block diagram of a subset of the embodiment including the CM recording section and the characteristics comparing section.
Figure 11:
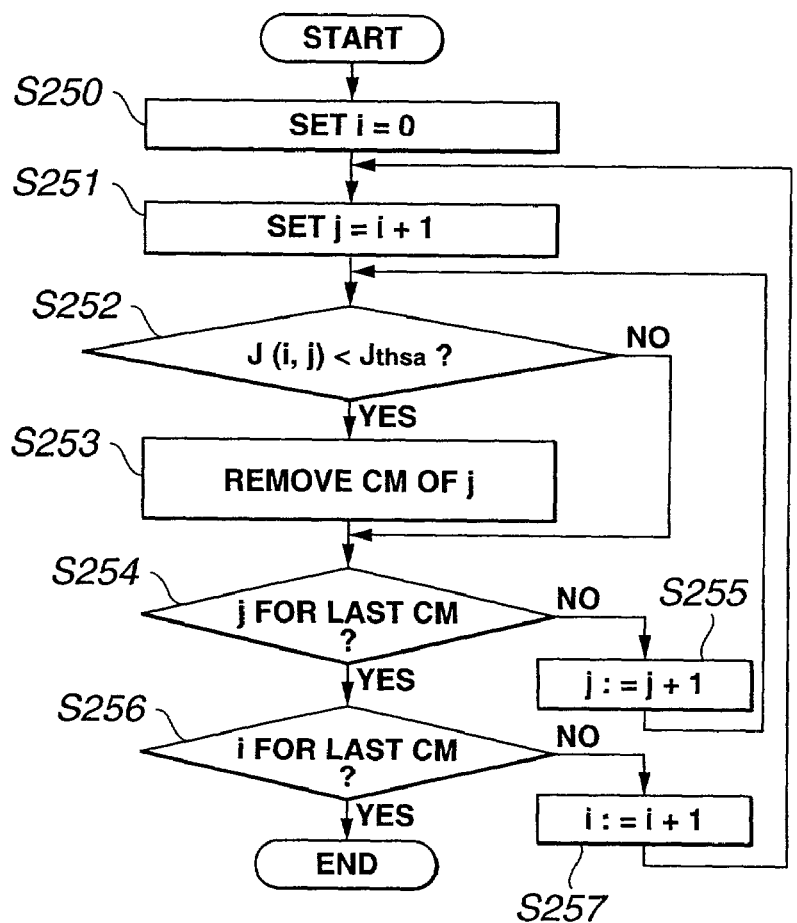
FIG. 11 is a flow chart of the operation of the subset of FIG. 10.

FIG. 10 is a schematic block diagram of a subset of the embodiment including the CM recording section 205 and the characteristics comparing section. FIG. 11 is a flow chart of the operation of the subset of FIG. 10, that of the characteristics comparing section 204 in particular.

Referring to FIG. 11, the characteristics comparing section 204 sets the variable i of said index to 0 in Step S250 and then sets the variable j of said index to i+1.

Subsequently, the characteristics comparing section 204 carries out computations for the evaluation function J(i,j) on the basis of the characteristic vectors $V_i$ and $V_j$ and compares it with a predetermined threshold value $J_{thsd}$ in Step S252. If the value of the function J(i,j) is lower than the threshold value $J_{thsd}$ (Yes), the two CMs are determined to be same and the CM represented by the characteristic vector $V_j$ is removed from the CM recording section 205 in Step S253. If, on the other hand, the value of the function J(i,j) is not lower than $J_{thsd}$ (No), the two CMs are determined to be different from each other and the processing operation proceeds to Step S254.

As the processing operation proceeds to Step S254, the characteristics comparing section 204 checks if the value of j corresponds to the last CM number among the CMs to be compared or not. If it is determined in Step S254 that the value of j does not correspond to the last CM member (No), j is incremented in Step S255 and the processing operation returns to Step S252, where J(i,j) is compared with the threshold value once again. If, on the other hand, it is determined in Step S254 that the value of j corresponds to that last CM member (Yes), it is determined in Step S256 if i corresponds to the last CM number or not. If it is determined in Step S256 that the value of i does not correspond to the last CM number (No), i is incremented in Step S257 and the processing operation returns to Step S251 to set j once again. If, on the other hand, it is determined in Step S256 that the value of i corresponds to the last CM number (Yes), the processing operation is terminated there.

Figure 12:
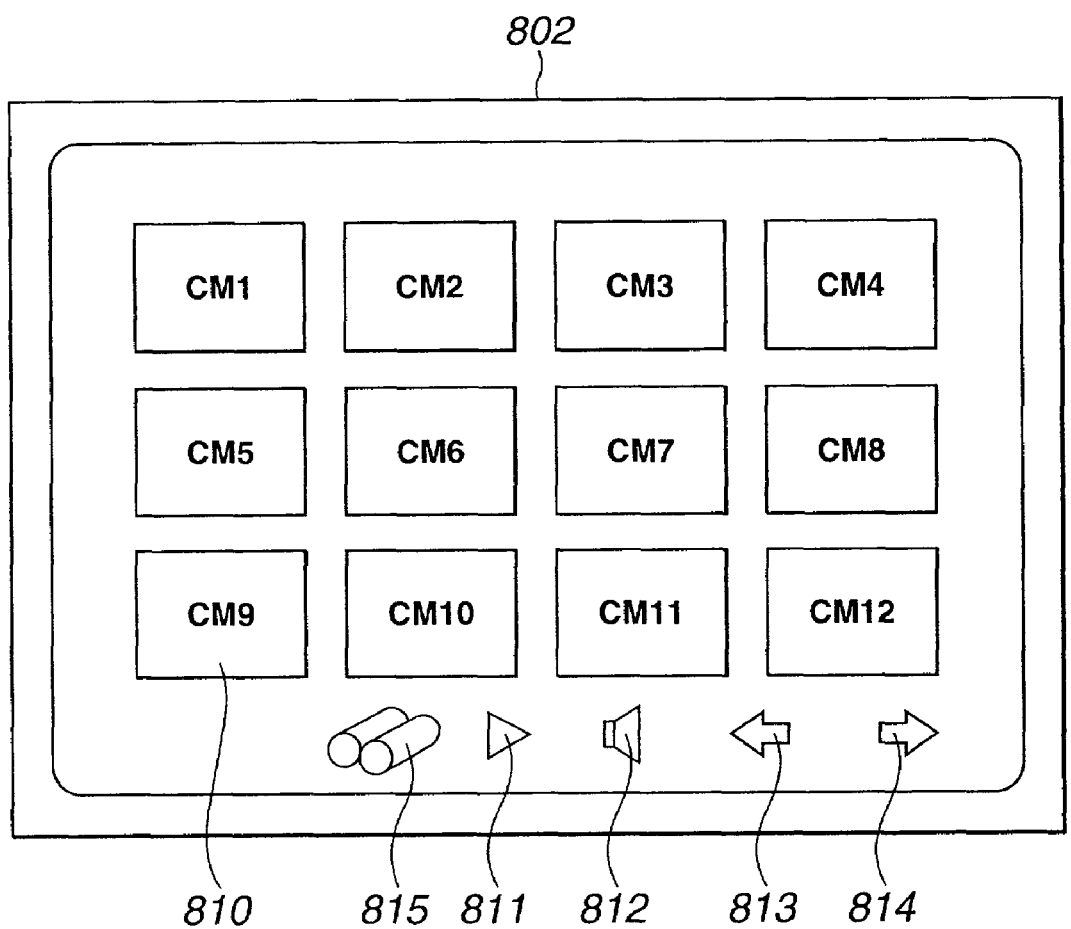
FIG. 12 is a schematic illustration of another image that can be displayed on the display screen of the display section of the embodiment (to show retrieval icons)

In this embodiment of broadcast signal processing device, additionally retrieval icons may be added to the displayed scene of the display section 802 illustrated in FIG. 7 so that the CM wanted by the user may be retrieved by specifying the corresponding retrieval icon. FIG. 12 schematically illustrates a scene displayed on the display section 802 and containing an additional retrieval icon 815. The operations of the CM recording section 205, the characteristics comparing section 204, the CM viewing section 208, the CM index generating section 206 and the CM selecting section 207 will be described by referring to the illustrated image of FIG. 12.

As the retrieval icon 815 is specified by the user 209, the CM selecting section 207 generates user selection information 207a corresponding to the user's selection and transmits the user selection information 207a to both the CM viewing section 208 and the characteristics comparing section 204.

Upon receiving the user selection information 207a, the characteristics comparing section 204 retrieves the CM having characteristics whose values partially agree with those of the CM that is already selected in the CM index image or the video image 810.

More specifically, when a CMi is selected by the CM selecting section 207 according to the user selection information 207a, the characteristics comparing section 204 compares the characteristic values of the CMi with the characteristic values of the CMj that is recorded in the CM recording section 205.

For carrying out this comparing operation, the characteristics comparing section 204 firstly carries out computations for the evaluation function J'(i,j) of the CM part section, using formula (10) below;

$$J'(i, j) = \sum_{n=N_s}^{N_e} |V_i[n] - V_j[n]|^2 \quad (10)$$

where $N_s$ denotes the first processing frame number of the CM part section to be compared and $N_e$ denotes the last processing frame number of the CM part section to be compared.

Subsequently, the characteristics comparing section 204 compares the evaluation function J'(i,j) with the predetermined threshold value $J'_{thsd}$ and determines that they do not agree with each other when the former is greater than the latter value but they do when the former is not greater than the latter.

It should be noted here that different CMs provided by a same sponsor may often be so designed as to make the viewer have a feeling of sameness or similarity by using common video/audio signals that are specific to a particular product or a particular company or some other organization. Then, the common video/audio signals will normally last for about a second. Therefore, if $N_e=N-1$ is used for the last frame number of the CM section and $N_s$ is used for the processing frame preceding the last frame by one second, all the CMs provided by a same company can be retrieved by specifying one of the CMs of the company.

The evaluation function J'(i,j) to be used for comparing characteristics values may alternatively be defined by formula (11) below;

$$J'(i, j) = \text{Min}_s \sum_{n=sN_\omega}^{(s+1)N_\omega} |V_i[n] - V_j[n]|^2 \quad (11)$$

where $N_w$ denotes the span to be used for retrieving agreeing parts whose characteristic values agree with each other and s denotes the index number that is used for shifting the span for retrieving partially agreeing parts from the beginning to the end of the CM section. $\text{Min}_s ( )$ denotes the smallest value of all the values of s. It will be effective to use only the sound-related characteristic values A[n], F[k;n] and P[k;n] excluding the image-related characteristic values $H_1[n]$, $H_c[n]$, B[n], D[n] and C[n] from the vector [n].

By using such a function, it is possible to retrieve CMs that partly agree with each other. For example, CMs containing a same piece of background music may be retrieved. If the CMs of a particular product or a particular company or some other organization are designed to provide a sense of continuation, they are often made to contain a same piece of background music in order to make the viewers have a feeling of sameness of similarity. Therefore, the function can be an effective evaluation function to be used for retrieving CMs that are designed to provide a sense of continuation.

The evaluation functions J(i,j) and J'(i,j) may be referred to as similarity of two CMs.

The audio and video signals of the CM retrieved from the CM recording section 205 are then sent to the CM viewing section 208 as recording section reproduced signal 205*a*.

At the same time, the index generating section 206 generates index information on the CMs whose characteristic values agree with each other and transmits the generated index information 206*a* to the CM viewing section 208.

As a result, the CM viewing section 208 can display the image of the retrieved CM and/or reproduce the sound of the CM.

Figure 13:
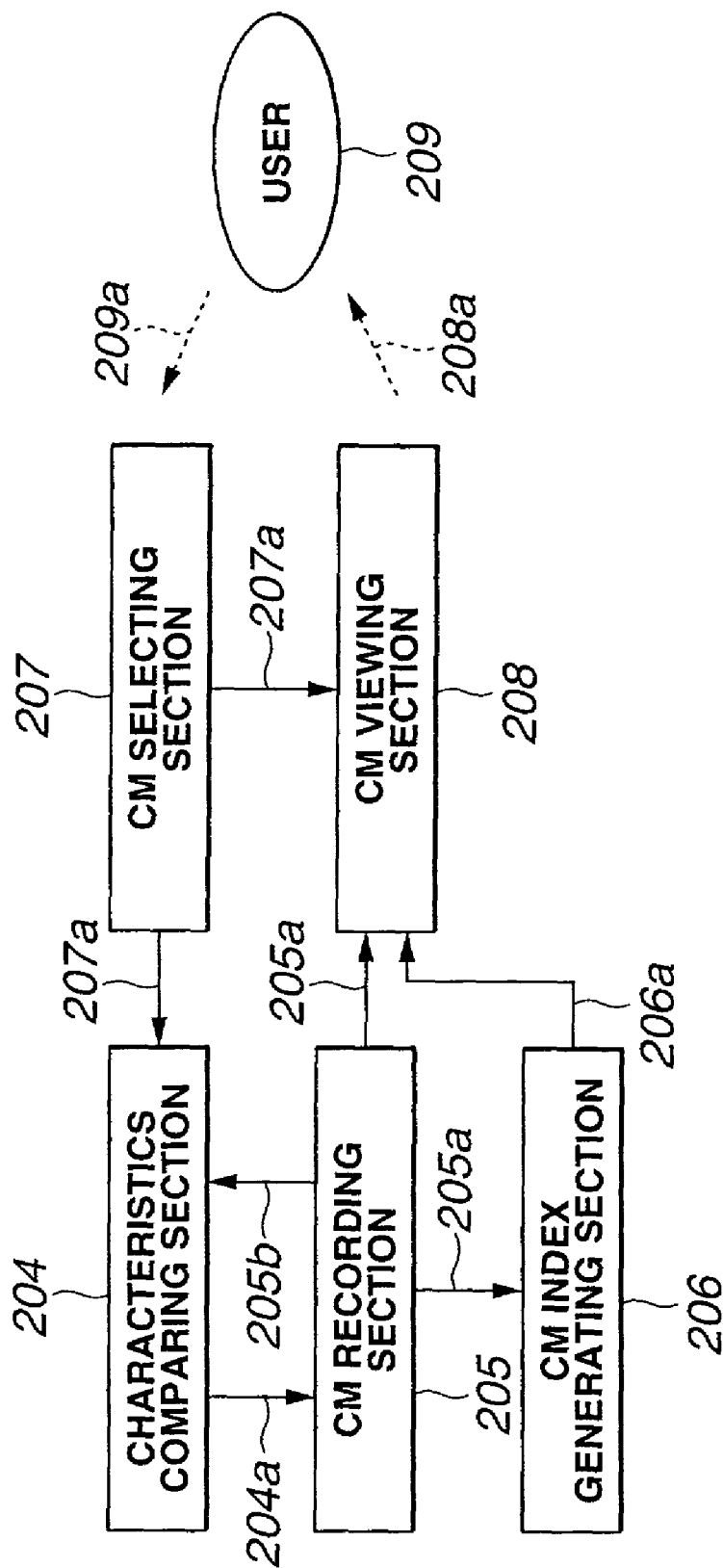
FIG. 13 is a schematic block diagram of a subset of the embodiment including the CM recording section, the characteristics comparing section, the CM index generating section, the CM viewing section and the CM selecting section.
Figure 14:
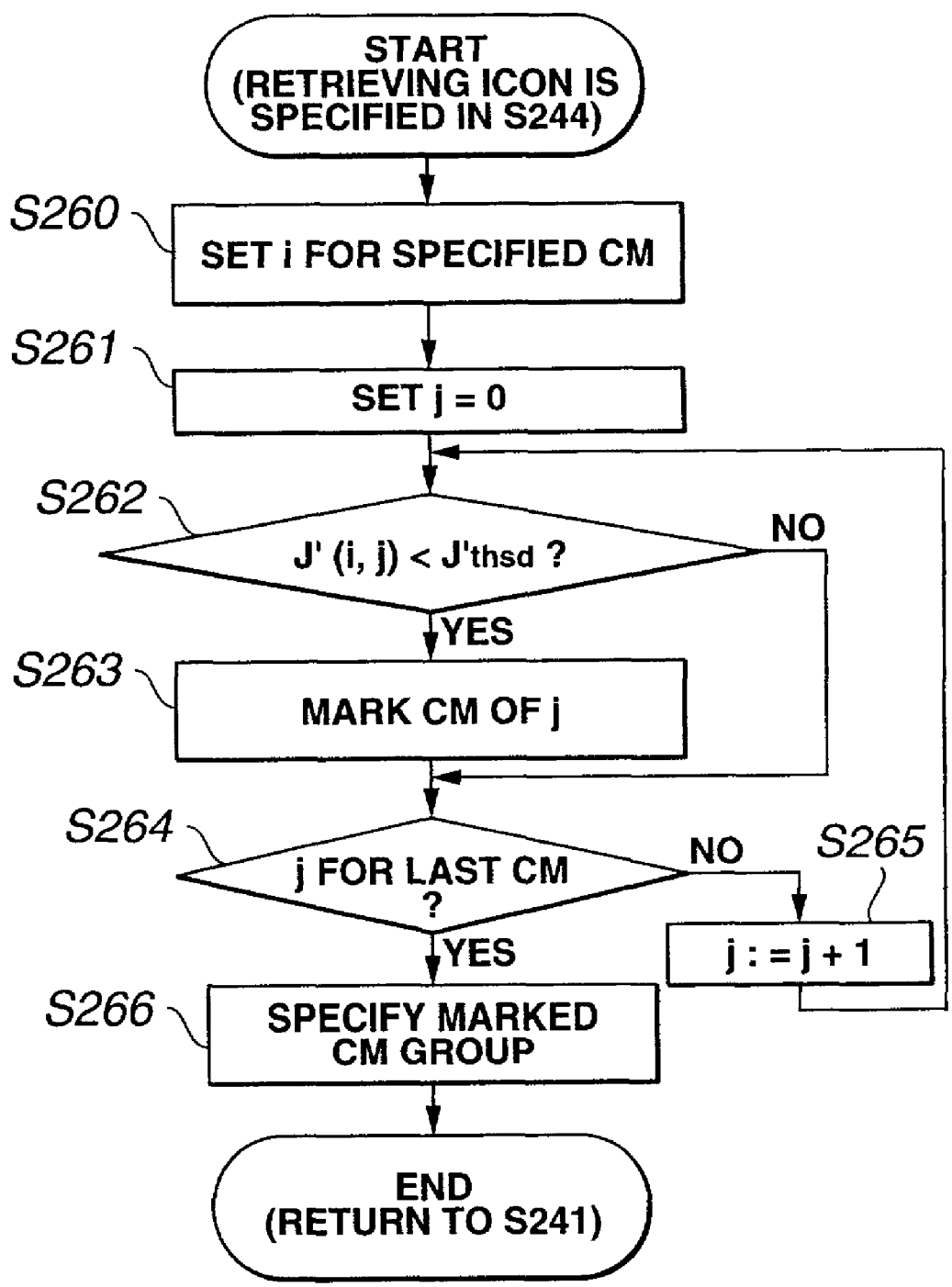
FIG. 14 is a flow chart of the operation of the subset of FIG. 13.

FIG. 13 is a schematic block diagram of a subset of the embodiment including the CM recording section 205, the characteristics comparing section 204, the CM index generating section 206, the CM viewing section 208 and the CM selecting section 207. FIG. 14 is a flow chart of the operation of the subset of FIG. 13. It will be appreciated that the flow chart of FIG. 14 comes immediately after the flow chart of FIG. 9.

Referring to FIG. 14, when the processing operation waits for a user's instruction in Step S244 in the flow chart of FIG. 9 and the user selection information 207*a* specifies the CM retrieval icon 815, the characteristic comparing section 204 sets the index variable i to the value of the index of the selected CM in Step S260 and then sets the index variable j to 0 in Step S261.

Subsequently, the characteristics comparing section 204 carries out computations for the evaluation function J'(i,j) in Step S262, using the characteristic vectors $V_i$ and $V_j$, and compares the obtained value with the predetermined threshold value J'$_{thsd}$. If it is determined that the obtained value is not greater than the threshold value J'$_{thsd}$ (Yes), the CM is judged to be a similar CM and the CM represented by the characteristic vector $V_j$ is marked in Step S263. If, on the other hand, it is determined that the obtained value is greater than the threshold value J'$_{thsd}$ (No), the CM is judged to be not a similar CM and the processing operation proceeds to the next step, or Step S294.

In Step S294, the characteristics comparing section 204 checks if the value of j corresponds to the last CM number among the CMs to be compared or not. If it is determined in Step S294 that the value of j does not correspond to the last CM member (No), j is incremented in Step S265 and the processing operation returns to Step S262, where J(i,j) is compared with the threshold value once again. If, on the other hand, it is determined in Step S266 that the value of j corresponds to that last CM member (Yes), all the marked CMs are specified collectively and the processing operation returns to Step S241 shown in FIG. 9, where signals of the specified CMs are retrieved from the CM recording section 205.

This embodiment may alternatively be so arranged that the same CMs are not removed but stored and, the number of times and the clock times when same CMs are broadcast by retrieving them, detecting the agreement in all the CM sections.

As will be appreciated from the above description, with this embodiment of broadcast signal processing device, only the CM sections can be extracted from a broadcast signal and stored. Therefore, it is possible to provide a data base device adapted to store only the CM sections of a program without recording the program itself.

Additionally, with this embodiment of broadcast signal processing device, only the CM sections can be extracted from a broadcast signal along with characteristic values characterizing the CM sections so that the characteristic values may be stored. Then, it is possible to provide a data base device adapted to store only the CM sections of a program and their characteristic values without recording the program itself. Such characteristic values are useful when retrieving same CMs and/or similar CMs.

Still additionally, with this embodiment of broadcast signal processing device, any of the stored CMs can be displayed and viewed so that the viewer (user) can display a list of the stored CMs and reproduce and retrieve any CMs he or she wants. This functional feature is particularly useful when the viewer wants to detect and view a specific CM.

Still additionally, with this embodiment of broadcast signal processing device, any duplicate CMs can be removed from the stored CMs to save the storage capacity and eliminate the trouble of repeatedly viewing same CMs.

Furthermore, with this embodiment of broadcast signal processing device, it is possible to retrieve similar CMs so that the CMs of a same product and the CMs of a same provider can be retrieved and displayed with ease.

Furthermore with this embodiment of broadcast signal processing device, it is possible to retrieve CMs having a same end part. Because CMs of a same product or a same company or some other organization normally contains a common image and a common sound, it is now possible to retrieve the CMs of a same product or a same provider can be retrieved and displayed with ease.

Still furthermore, with this embodiment of broadcast signal processing device, it is now possible to retrieve CMs containing a common piece of background music. Because CMs of a same product or a same company or some other organization often contains a common piece of background music, different CMs prepared with a sense of continuity can be retrieved and displayed without difficulty.

Finally, with this embodiment of broadcast signal processing device, it is possible to observe the number of times and the clock times when same CMs are broadcast. This functional feature can be of great help to the producer of a CM when he or she compares each scheduled transmission of the CM and the corresponding actual transmission of the CM.

Now, the operation of the CM detecting section 202 of FIG. 1 for detecting CMs out of a broadcast signal along with the start time and the length of each CM will be discussed below in greater detail.

Firstly, the principle underlying the operation of detecting a CM section out of a TV broadcast signal of the CM detecting section 202 will be briefly described. In the following description, while the term "a characteristic value" may or may not mean same as the term "characteristic" as used above from viewpoint of the CM characteristics extracting section 203 and the characteristics comparing section 204, although the both are used to express a characteristic aspect of a CM. Therefore, the two terms are used here indiscriminately.

Generally, CMs that are broadcast through TV channels are prepared according to the specifications provided by the broadcasters particularly in terms of duration and hence "the time length (of a CM) is limited and cannot vary in many different ways". For instance, in Japan, all CMs have a duration of 15 seconds, 30 seconds or 60 seconds with very few exceptions.

Additionally, when a CM is broadcast, it is inserted into the stream of a TV program but prepared independently from the latter so that "the sound level falls (and becomes less audible)" and "the video signal is switched" inevitably before and after the CM. The expression that "the sound level falls" does not necessarily means that silence (or only a light noise) prevails there. In other words, the program can be switched to the CM or vice versa without a complete silence depending on the timing of the switch.

Almost all CMs show the three characteristic aspects of CMs including "specified time lengths (few variations in time length)", "a low sound level" and "a switched image". In other words, these are three "requirements" to be met by CMs. Therefore, these requirements will be referred to as "the three indispensable requirements" of CMs hereinafter.

Thus, it is deterministically possible to detect CM candidates (or signal parts that will probably represents the corresponding respective CMs) practically without error by detecting the signal parts that meets the indispensable requirements out of a TV broadcast signal. However, since programs can also contain signal parts that do not represent any CM but meet the indispensable requirements, there still remains a risk of erroneously detecting parts of the program as CM candidates if only the indispensable requirements are used for detecting CMs.

On the other hand, many CMs show some or all of the following characteristic aspects due to of the nature of CMs, although there are obviously more exceptions if compared with the indispensable requirements.

1) The sound level can be more often than not falls immediately before and after a CM (immediately before the start of a CM and immediately after the end of the CM and before the restart of the program itself).
2) A silence of several hundred milliseconds can often appear between a CM and the program containing the CM or between a CM and another CM.
3) The sounded sections of a TV program normally have a length shorter than the specified durations of CMs (15 seconds, 30 seconds, 60 seconds) by more than about hundred milliseconds and less than about a second.
4) The correlative value of the left channel (L-channel) and the right channel (R-channel) of a stereophonic sound signal is more often than not significantly smaller than 1.
5) The sound level of CMs is often higher than that of programs.
6) CMs are often broadcast in a stereophonic mode
7) A plurality of CMs are often broadcast in a CM section.
8) More video cuts are used per unit time in CMs than in programs.
9) To the contrary, there are CMs containing extremely small video cuts per unit time (e.g., CMs using still images).
10) The sound quality can remarkably change at the boundary of a program and a CM or that of two CMs.
11) CMs often contain both voices and music.
12) CMs are broadcast with a high probability on the hour.
13) Similarly, CMs are broadcast with a high probability on the half hour.
14) There are time slots where CMs are broadcast highly probably depending on the program category (e.g., during the half time of the live of a succor match)

For the purpose of the present invention, the requirements that arises from the above characteristic aspects of CMs will be referred to as "additional requirements". In other words, the additional requirements occurs from the fact that CMs are produced by conforming to given specifications, that CMs are intended to achieve an advertising effect in a very short period of time and that CMs are subject to programming restrictions. Therefore, while the additional requirements are not deterministically reliable, they are effective when evaluating the probability of each CM.

In TV broadcasts, the images and sounds of two or more than two channels will never be transmitted through a single channel. In other words, if two video and audio sections that satisfy the above additional requirements are found in a TV broadcast signal and are overlapping each other and CM candidates are detected in such partly overlapping sections when detecting signal parts (CM candidates) from a TV broadcast signal, either of the overlapping video and sound sections cannot represent a right CM section. For the purpose of the invention, this requirement of TV broadcasts is referred to as "logical requirement".

Thus, for the purpose of the invention, the above described "indispensable requirements", "logical requirement" and "additional requirements" are rationally and effectively utilized to accurately detect CM sections from a TV broadcast signal.

More specifically, according to the invention, CM candidates (signal parts that probably represent respective CMs) are deterministically extracted from a TV broadcast signal on the basis of the "indispensable requirements" and selected according to statistic criteria that are based on the "additional requirements and any overlapping relationship of CMs is eliminated on the basis of the "logical requirement" to accurately detect CMs.

Figure 15:
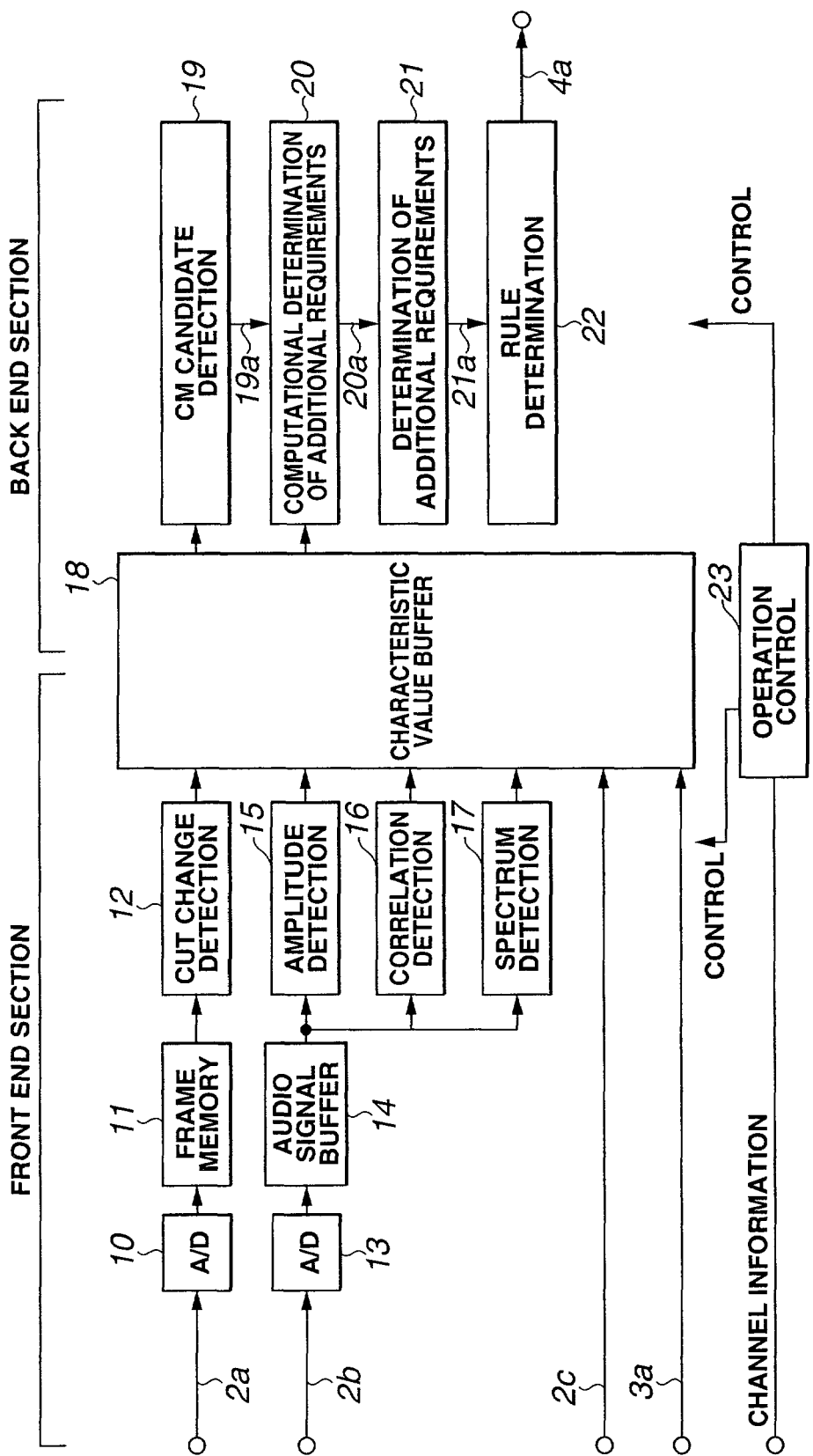
FIG. 15 is a schematic block diagram of the CM detecting section, illustrating a possible first configuration thereof.

FIG. 15 is a schematic block diagram of the CM detecting section, illustrating a possible first configuration thereof. Roughly speaking, the CM detecting section 202 comprises a front end section and a rear end section. In FIG. 15, the operation control section 23 determines if the broadcasting channel being detected is a channel where CMs are broadcast or not on the basis of channel information 1b that indicates the type of the channel and controls the components of FIG. 15 so as not to operate for detecting CMs if the channel is not used for broadcasting CMs.

Firstly, the front end section of FIG. 15 will be described.

Referring to FIG. 15, the video signal 2a, the audio signal 2b and the broadcasting mode signal 2c of the input signal 200a are input to the front end section. The time information 3a generated by a clock (not shown) is also fed to the front end section.

The video signal 2a is digitized by A/D converter 10 and stored in frame memory 11, which is adapted to store at least video signals for two frames. The video signal read out from the frame memory 11 for each frame is then sent to cut change detector 12.

The cut change detector 12 detects frames where the image changes abruptly (to be referred to as image change frames hereinafter) and frames showing a uniform luminance (to be referred to as uniform luminance frames hereinafter) on the basis of the video signal of each frame fed from the frame memory 11.

More specifically, the cut change detector 12 determines the difference of the square sums of the pixels of the temporally adjacent frames stored in the frame memory 11 and detects the temporally succeeding one of the two adjacent frames as image change frame where the image changes abruptly if the difference of the square sums exceeds a predetermined threshold value. Additionally, the cut change detector 12 determines the variance of luminance of the image of each of the frames stored in the frame memory 11 and detects the frame as a uniform luminance frame if the variance of luminance of the frame is under a predetermined threshold value. If the time interval separating two adjacent frames (about 30 ms in the case of the NTSC system) does not agree with the frame period in the audio signal processing operation which will be described hereinafter, it is made to agree with the frame period by rediscretizing the time interval of two adjacent frames.

Now, the operation of detecting image change frames and uniform luminance frames of the cut change detector 12 will be described below in greater detail.

Assume that the transversal size and the longitudinal size of a discretized video signal are X and Y respectively, that the transversal and longitudinal pixel numbers of each pixel are expressed by x, y respectively and that the image of the n-th frame is expressed by $I_n(x,y)$ while the image of the (n−1)-th frame that temporally immediately precedes the n-th frame is expressed by $I_{n-1}(x,y)$. Then, the square sum D[n] of the difference of luminance of the pixels between the n-th frame and the (n−1)-th frame is obtained by formula (12) below and the variance of luminance of the n-th frame V[n] is expressed by formula (13) below.

$$D[n] = \sum_{x=0}^{X-1}\sum_{y=0}^{Y-1}(I_n(x,y)-I_{n-1}(x,y))^2 \quad (12)$$

$$V[n] = \frac{1}{XY}\sum_{x=0}^{X-1}\sum_{y=0}^{Y-1}I_n^2(x,y) - \left(\frac{1}{XY}\sum_{x=0}^{X-1}\sum_{y=0}^{Y-1}I_n(x,y)\right)^2 \quad (13)$$

The detection output C[n] of the cut change detector 12 is expressed by formula (14) below;

$$C[n] = \begin{cases} 1(D[n] \geq D_{thsd} \text{ or } V[n] \leq V_{thsd}) \\ 0(D[n] < D_{thsd} \text{ and } V[n] > V_{thsd}) \end{cases} \quad (14)$$

where $D_{thsd}$ is the predetermined threshold value for the square sum that is used when detecting an image change frame and $V_{thsd}$ is the predetermined threshold value for the variance of luminance that is used when detecting a uniform luminance frame.

The detection output C[n] of the cut change detector 12 is then sent to characteristic value buffer 18 as a characteristic value of the video signal.

When determining the difference of luminance between the two frame images, a memory having a storage capacity for storing video signals of two frames is required and the detector 12 is required to carry out arithmetic operations on the video signals of two frames. However, the storage capacity and the amount of arithmetic operations can be reduced by dividing a frame image into small blocks and determining the difference of luminance for each block instead of treating the entire frame image at a same time. Alternatively, they can be reduced by determining the luminance histogram of each frame and subsequently the difference in the luminance histogram between two frames instead of determining the difference of luminance for each pixel. Still alternatively, they can be reduced by determining the average luminance for each frame image and subsequently the difference in the average luminance between two frames. To the contrary, if the storage capacity and the amount of arithmetic operations do not exceed respective permissible levels, the accuracy of detection can be improved by determining the difference of luminance and that of color histogram for individual component colors such as R (red), G (green) and B (blue).

Meanwhile, the audio signal 2b is digitized by A/D converter 13 and stored in audio signal buffer 14. The audio signal buffer 14 has a storage capacity for storing at least 2-channel stereophonic audio signals for left (L) and right (R) for a predetermined time period $T_1$ (e.g., 30 ms, which is to be referred to as a frame length hereinafter). The audio signals read out from the audio signal buffer 14 are then sent to amplitude detector 15, correlation detector 16 and spectrum detector 17.

The amplitude detector 15 detects the mean square amplitude of a predetermined short period of time $T_2$ (e.g., 15 ms, which is to be referred to as a frame period hereinafter) from the audio signals stored in the audio signal buffer 14. More specifically, if the audio signal buffer 14 stores 2-channel stereophonic audio signals for left and right, the amplitude detector 15 detects the short period mean square amplitude of each predetermined time period $T_2$ (15 ms, 1 frame period) from the 2-channel stereophonic audio signals $S_L[m]$ and $S_R[m]$. Note that m(m=0, . . . , M−1) represents the sample number in the buffer, showing a discretized time period, and the largest number M corresponds to a frame length $T_1$.

More specifically, the amplitude detector 15 calculates the mean square amplitude A[n] for the 2-channel audio signals for left and right in the n-th frame by using formula (15) below.

$$A[n] = \frac{1}{4M}\sum_{m=0}^{M-1}(S_L[m+nT_2]+S_R[m+nT_2])^2 \quad (15)$$

The mean square amplitude A[n] obtained by, or the detection output of, the amplitude detector 15 is then sent to characteristic value buffer 18 as a characteristic value of the audio signal.

The correlation detector 16 detects the correlation coefficient for the audio signal of each frame prior to the normalization, using the audio signals stored in the audio signal buffer 14 and also the short period energy to be used in the operation of normalization to be carried out downstream. If the audio signal buffer 14 stores 2-channel stereophonic signals for left and right, the correlation detector 16 detects the correlation coefficient for the 2-channel audio signals for left and right for a frame prior to the normalization out of the 2-channel stereophonic signal for left and right read out from the audio signal buffer 14 and also the short period energy to be used in the operation of normalization to be carried out downstream.

More specifically, the correlation detector 16 calculates the correlation efficient $A_{LR}[n]$ of the 2-channel audio signals for left and right for the n-th frame by using formula (16) below. It also calculates the left channel audio signal energy $A_{LL}[n]$ by using formula (17) and the right channel audio signal energy $A_{RR}[n]$ by using formula (18) as shown below.

$$A_{LR}[n] = \sum_{m=0}^{M-1} S_L[m+nT_2]S_R[m+nT_2] \qquad (16)$$

$$A_{LL}[n] = \sum_{m=0}^{M-1} S_L^2[m+nT_2] \qquad (17)$$

$$A_{RR}[n] = \sum_{m=0}^{M-1} S_R^2[m+nT_2] \qquad (18)$$

The detection output of the correlation detector 16 including the correlation coefficient $A_{LR}[n]$, the left channel audio signal energy $A_{LL}[n]$ and the right channel audio signal energy $A_{RR}[n]$ are sent to the characteristic value buffer 18 as so many characteristic values.

The spectrum detector 17 calculates the short period spectrum by using the audio signals stored in the audio signal buffer 14. If the audio signal buffer 14 stores 1-channel stereophonic audio signals for left and right, the spectrum detector 17 calculates the short period spectrum out of the 2-channel stereophonic audio signals $S_L[m]$ and $S_R[m]$ for left and right read out from the audio signal buffer 14.

More specifically, the spectrum detector 17 determines the discrete spectrum $F[k;n]$ of the 2-channel audio signals for left and right of the n-th frame. If $k=0, \ldots, K-1$ represents the discretized frequency, the discrete spectrum $F[k;n]$ is expressed by formula (19) below.

$$F[k;n] = \left| \sum_{m=0}^{M-1} (S_L[m]+S_R[m])e^{-2\pi jmk/M} \right|^2 \qquad (19)$$

The arithmetic operation of formula (19) can be realized typically by means of an appropriate technique such as Fast Fourier Transform (FFT) or linear prediction analysis (LPC).

The computational output, or the short period discrete spectrum $F[k;n]$ of the spectrum detector 17 is sent to the characteristic value buffer 18 as a characteristic value for the audio signal.

The broadcasting mode signal 2c is made to show a discretized value that conforms to the above described audio signal processing frame.

More specifically, the broadcasting mode signal 2c of the n-th frame may be made to show a numerical value $B[n]$ as expressed by formula (20).

$$B[n] = \begin{cases} 0 (\text{monaural mod } e) \\ 1 (\text{stereophonic mod } e) \\ 2 (\text{sound} - \text{multiplex mod } e) \end{cases} \qquad (20)$$

The numerical value $B[n]$ obtained by discretizing the broadcasting mode signal 2c is then sent to the characteristic value buffer 18 as a characteristic value of the TV broadcast signal.

Similarly, temporal signal 3a is also made to show a discretized numerical value $T[n]$ that conforms to the audio signal processing frame and sent to the characteristic value buffer 18 as a characteristic value.

Then, the characteristic value buffer 18 stores the characteristic value $G[n]$ shown in formula (21) below that includes the detection output $C[n]$ from the cut change detector 12, the means square amplitude $A[n]$ from the amplitude detector 15, the correlation coefficient $A_{LR}[n]$ and the audio signal energy values $A_{LL}[n]$ and $A_{RR}[n]$ from the correlation detector 16, the short period discrete spectrum $F[k;n]$ from the spectrum detector 17, the discretized numerical value $B[n]$ of the broadcasting mode signal 2c and the discretized numerical value $T[n]$ of the temporal signal 3a for a predetermined period of time $T_3$. Note that the time $T_3$ is so determined that the buffer can store at least a CM and may typically be 80 seconds.

$$G[n]=\{C[n], A[n], A_{LR}[n], A_{LL}[n], A_{RR}[n], F[k;n], B[n], T[n]\} \qquad (21)$$

Figure 16:
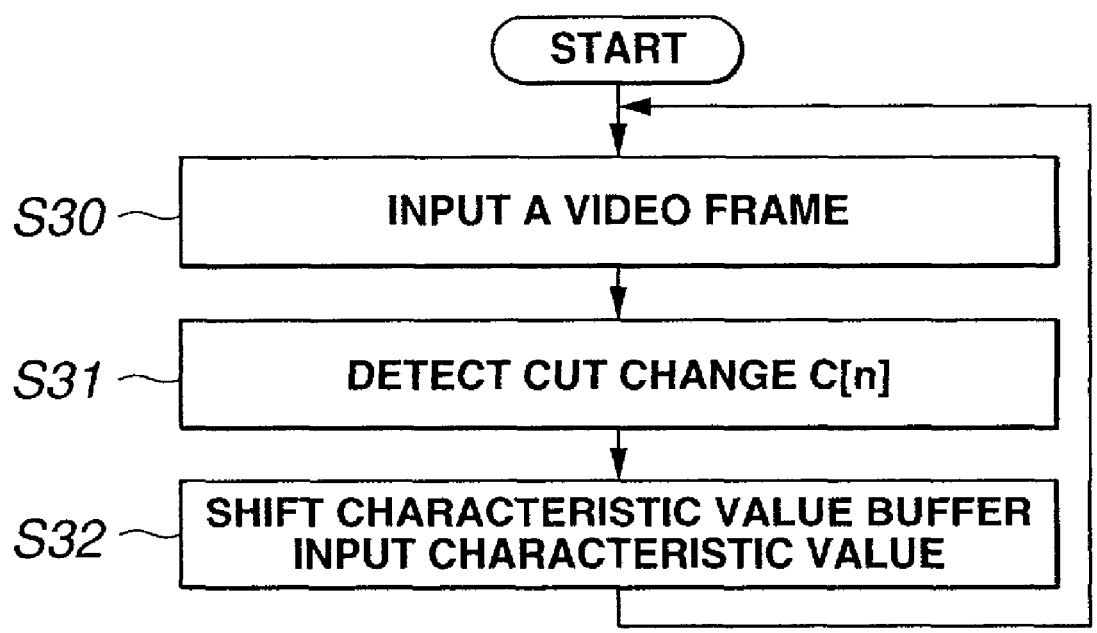
FIG. 16 is a flow chart of the operation of the video signal processing operation of the front end part of the CM detecting section of the embodiment.
Figure 17:
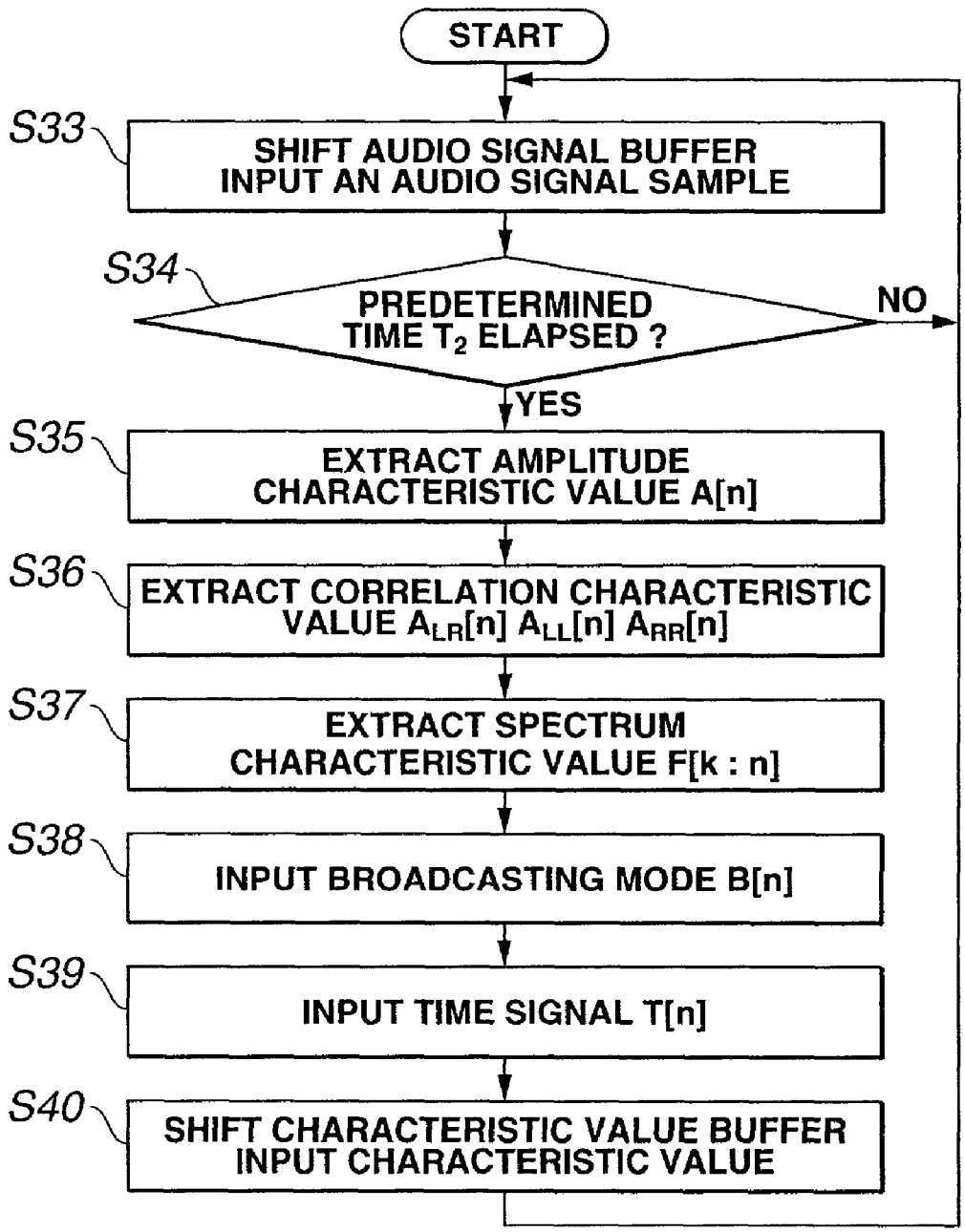
FIG. 17 is a flow chart of the operation of the audio signal processing operation of the front end part of the CM detecting section of the embodiment.

The front end section of the CM detecting section 202 shown in FIG. 15 comprises the above described components from the A/D converter 10 to the characteristic value buffer 18. Now, the operation of the front end section will be described by referring to the flow charts of FIGS. 16 and 17. Note that Steps S30 through S32 in FIG. 16 are for the video signal 2a, whereas Steps S33 through S40 in FIG. 17 are for the audio signal 2b, the broadcasting mode signal 2c and the temporal signal 3a.

Firstly, the operation of processing the video signal 2a will be described by referring to FIG. 16. In Step S30, the front end section stores the video signal 2a for at least a frame that is digitized by the A/D converter 10 in the frame memory 11. The frame memory 11 is so designed as to handle a video signal 2a for a frame as a sample. Therefore, as the video signal 2a for a frame is input, the video signals 2a already stored in the frame memory 11 are shifted by a frame and the video signal 2a that was stored first in the frame memory 11 is pushed out as output.

Next, the front end section reads out the video signal 2a from the frame memory 11 and transmits it to the cut change detector 12 in Step S31, which cut change detector 12 by turn produces the detection output $C[n]$ in a manner as described above.

Then, the front end section stores the detection output $C[n]$ in the characteristic value buffer 18 in Step S32.

Now, referring to FIG. 17 showing the operation of processing the audio signal 2b, the front end section inputs the audio signal 2b that is digitized by the A/D converter 13 into the audio signal buffer 14 and stores the audio signal 2b for at least a frame period $T_2$ in the audio signal buffer 14 in Steps S33 and S34. The audio signal buffer 14 is so designed as to handle an audio signal 2b for a frame period $T_2$ as a sample. Therefore, as the audio signal 2b for a frame period $T_2$ is input, the audio signals 2b already stored in the audio signal buffer 14 are shifted by a frame period $T_2$ and the audio signal 2*b* for a frame period $T_2$ that was stored first in the audio signal buffer 14 is pushed out as output.

As the audio signal buffer 14 stores at least an audio signal 2*b* for a frame period $T_2$, the front end section reads out the audio signal 2*b* stored in the audio signal buffer 14 and transmits it to the amplitude detector 15 in Step S35, which amplitude detector 15 by turn produces the means square amplitude A[n] in a manner as described above.

At the same time, the front end section transmits the audio signal 2*b* stored in the audio signal buffer 14 to the correlation detector 16 in Step S36, which correlation detector 16 by turn produces the correlation coefficient $A_{LR}[n]$ and the audio signal energy values $A_{LL}[n]$, $A_{RR}[n]$ in a manner as described above.

Concurrently, the front end section transmits the audio signal 2*b* stored in the audio signal buffer 14 to the spectrum detector 17 in Step S37, which spectrum detector 17 by turn produces the short period discrete spectrum F[k;n] in a manner as described above.

Furthermore, the front end section determines the discretized numerical value B[n] from the broadcasting mode signal 2*c* and the discretized numerical value T[n] from the temporal signal 3*a* in Step S38.

Then, the front end section stores the characteristic value G[n] including the detection output C[n] from the cut change detector 12, the root-mean-square amplitude A[n] from the amplitude detector 15, the correlation efficient $A_{LR}[n]$ and the audio signal energy values $A_{LL}[n]$, $A_{RR}[n]$ from the correlation detector 16, the short period discrete spectrum F[k;n] from the spectrum detector 17, the discretized numerical value B[n] of the broadcasting mode signal 2*c* and the discretized numerical value T[n] of the temporal signal 3*a* in the characteristic value buffer 18.

Returning to FIG. 15, now the operation of the band end section will be described below. In the following description, n denotes the frame number of the characteristic value of each frame stored in the characteristic value buffer 18. The characteristic value of the most recent frame is expressed by G[0] and the value of n increases for an older frame so that, when the most recent frame is updated, the numbers of all the other frames and hence those of their characteristic values are shifted by 1).

Referring to FIG. 15, the characteristic values stored in the characteristic value buffer 18 are sent to CM candidate detector 19 on a frame by frame basis.

The CM candidate detector 19 computationally detects the CM section, if any, of each frame on the basis of the above described "indispensable requirements" that are satisfied by almost all CMs. The indispensable requirements include that the audio signal of a CM shows a "low sound level" and hence the sound level of the audio signal is below a predetermined threshold level (to be referred to as sound level requirement hereinafter), that there is a "switched image" and hence the video signal shows an abrupt change or a uniform luminance in a frame (to be referred to as video requirement hereinafter) and that there is a "specified time length (few variations in time length)" and hence the temporal interval of two frames that satisfy both the sound level requirement and the video requirement agrees with the time length of the CM (to be referred to as time requirement hereinafter). More specifically, these requirements can be defined by formulas (22), (23) and (24), using the above described characteristic values;

$$A[0] < A_{thsd} \quad (22),$$

$$C[0] = 1 \quad (23) \text{ and}$$

$$A[n_1] < A_{thsd}, C[n_1]=1 \text{ or } A[n_2] < A_{thsd}, C[n_2]=1 \text{ or } A[n_3] < A_{thsd}, C[n_3]=1 \quad (24)$$

where $A_{thsd}$ is the predetermined threshold value for the square-root amplitude and $n_1$, $n_2$ and $n_3$ are respective numerical values obtained by reducing the time lengths specified as CM lengths (e.g., 15 seconds, 30 seconds and 60 seconds as described above for the purpose of this embodiment) in terms of the unit of frame period. For the purpose of improving the practical applicability, the numerical values $n_1$, $n_2$ and $n_3$ are allowed to be slightly variable.

Now, the operation of the CM candidate detector 19 will be described by referring to FIG. 18.

Figure 18:
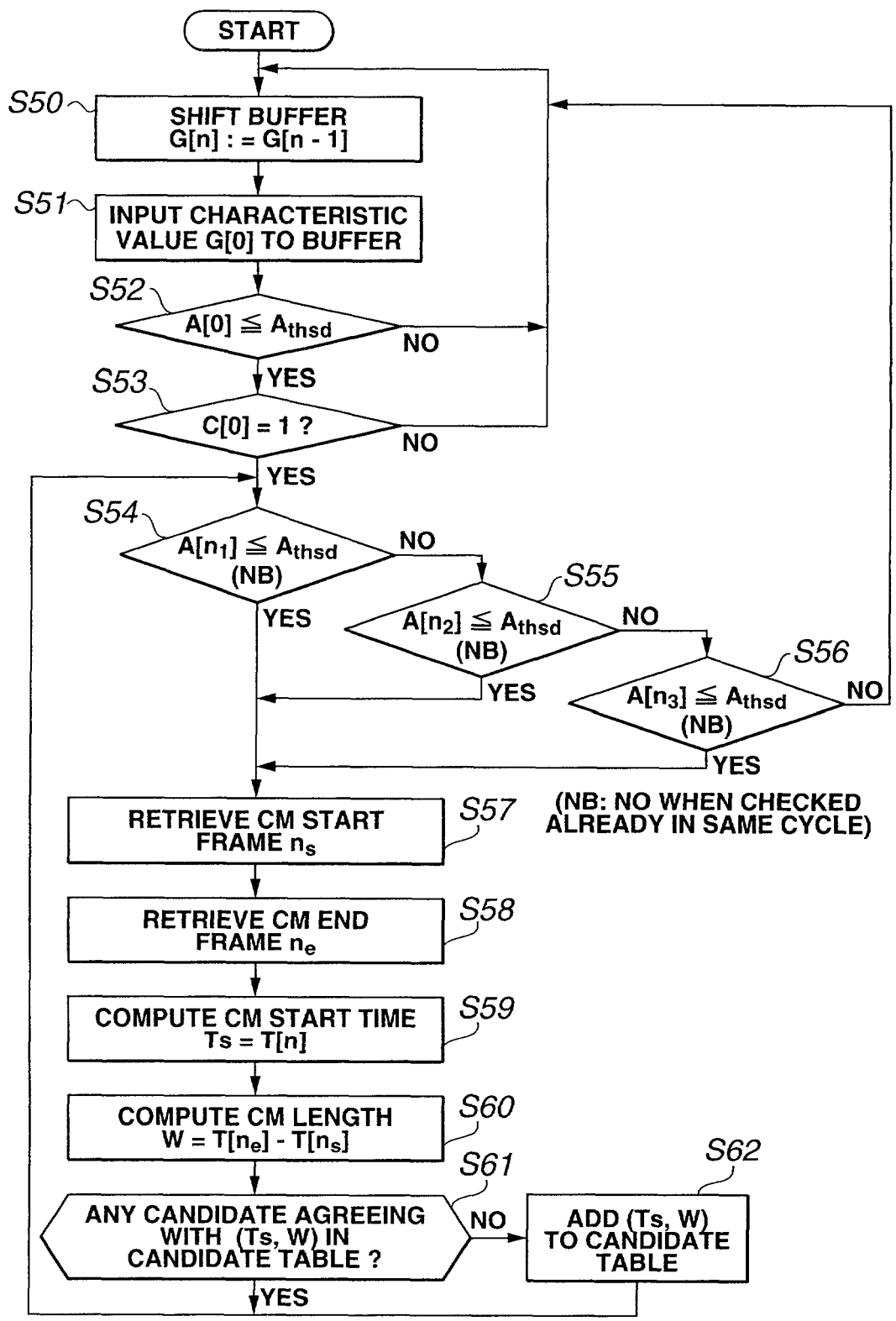
FIG. 18 is a flow chart of the operation of the CM candidate detector of the CM detecting section of the embodiment.

Referring to FIG. 18, like the frame memory and the audio signal buffer described above respectively by referring to Step S32 in FIG. 16 and Step S40 in FIG. 17, the characteristic value buffer 18 is so designed as to operates for inputting, shifting and outputting signals on the basis of a unit of a frame. In other words, the characteristic value buffer 18 is adapted to handle the characteristic value of a frame as a sample. Therefore, when the characteristic value of a frame is input, all the characteristic values already stored in the characteristic value buffer 18 are shifted by 1 frame and the characteristic value of a frame that was stored first in the characteristic value buffer 18 is pushed out as output.

As a result of the processing operations of Steps S50 and S51 of inputting the characteristic value of a frame (a sample) from the characteristic value buffer 18, the CM candidate detector 19 checks if the characteristic value of a frame (a sample) meets the indispensable requirements including the sound level requirement, the video requirement and the time requirement in Steps S52 and S53. More specifically, the CM candidate detector 19 determines if the frame meets the indispensable requirements including the sound level requirement, the video requirement and the time requirement or not by comparing the means square amplitude A[0] of the first frame and the predetermined threshold value $A_{thsd}$ for square-root amplitude in Step S52 and checking if the detection output C[0] is equal to 1 or not in Step S53. If it is determined by the CM candidate detector 19 that the means square amplitude A[0] does not exceed the predetermined threshold value $A_{thsd}$ for square-root amplitude and the indispensable requirements are met as a result of the processing operations of Steps S52 and S53, the frame is selected as CM candidate and the operation proceeds to Step S57 and on (Step S54 through S56 will be described hereinafter). If, on the other hand, it is determined by the CM candidate detector 19 that the means square amplitude A[0] exceeds the predetermined threshold value $A_{thsd}$ for square-root amplitude or the indispensable requirements are not met as a result of the processing operations of Steps S52 and S53, the frame is not selected as CM candidate and the operation returns to Step S50.

If it is determined that the means square amplitude A[0] does not exceed the predetermined threshold value $A_{thsd}$ for square-root amplitude and the indispensable requirements are met as a result of the processing operations of Steps S52 and S53, the CM candidate detector 19 retrieves the CM starting frame $n_s$ in Step S57 and also the CM ending frame $n_e$ in Step S58 and then computationally determines the CM starting time $T_s$ in Step S59 and also the CM length W in Step S60.

After the retrieving and computing operations of Steps S57 through S60, the CM candidate detector 19 refers to the CM candidate table, which will be described hereinafter, in Step S61 and, if it finds a CM candidate whose CM starting time $T_s$ and CM length $T_w$ respectively agree with those of the detected CM candidate, it returns to Steps S54 through 56. If, on the other hand, it does not find any such a CM candidate, it adds the CM candidate as new one and returns to Steps S54 through S56.

When the processing operations of Steps S54 through S56 are conducted for all the time lengths, the CM candidate detector 19 returns to Step S50 and repeats the above steps for the next input.

The CM starting frame $n_s$ refers to the frame number of the first frame whose means square amplitude A[n] exceeds the threshold value $A_{thsd}$ for square-root amplitude as viewed from the frame that meets the time requirements out of the frames expressed by $n_1$, $n_2$ and $n_3$ toward the most recent frame. Similarly, the CM ending frame $n_e$ refers to the frame number of the last frame whose means square amplitude A[n] does not exceed the threshold value $A_{thsd}$ for square-root amplitude as viewed from the 0-th frame toward the older frames. Furthermore, the CM starting time $T_s$ can be obtained by using the formula of $T_s=T[n_s]$ and the number of the CM starting frame $n_s$. Similarly, the CM length $T_w$ can be obtained by using the formula of $T_w=T[n_e]-T[n_s]$.

Figure 19:
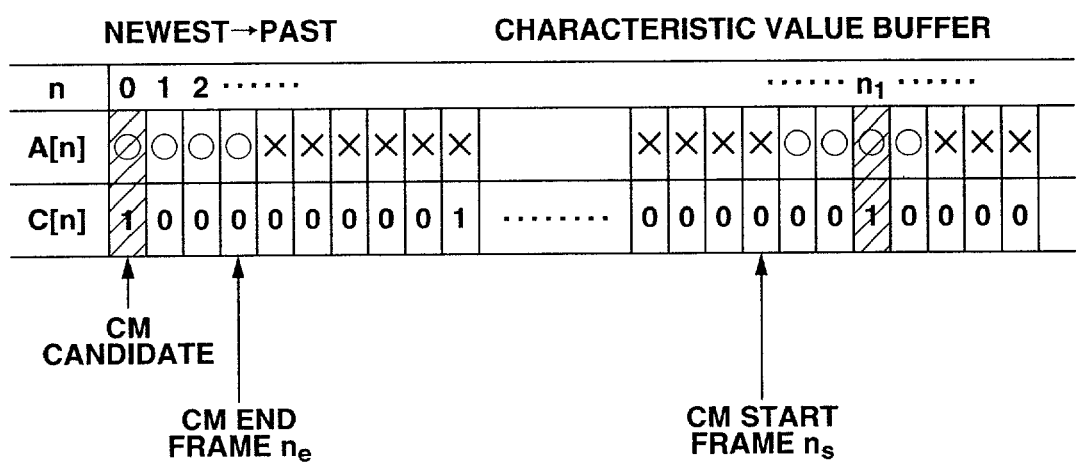
FIG. 19 is a schematic illustration of the operation of computationally determining the requirements to be met for the embodiment.

FIG. 19 shows an example that can be used for defining the indispensable requirements. In the row of A[n] in FIG. 19, [o] denotes a frame whose means square amplitude does not exceed the threshold value for square-root amplitude $A_{thsd}$ and [x] denotes a frame whose root-mean-square amplitude exceeds the threshold value for square-root amplitude $At_{thsd}$. In the illustrated example, A[0], C[0] and $A[n_1]$, $C[n_1]$ meet the requirements and the frame that is found left relative to $n_1$ and satisfies the requirement of A[n]=x is $n_s$, whereas the last one of the successive frames found right relative to 0 and satisfy the requirement of A[n]=o is $n_e$.

As a result of the above processing operation, the CM candidate detector 19 detects a CM candidate each time the characteristic value of a frame (sample) is input and, if a CM candidate is detected, it enters the candidate into the CM candidate table.

FIG. 20 shows an example of CM candidate table. Referring to FIG. 20, the CM candidate table contains items including the starting time $T_s$, the length $T_w$, the characteristic values $Q_1$ through $Q_{11}$ as determined by the additional requirement computing unit 20, which will be described hereinafter, and the score R and the result of score judgment Z determined by the additional requirement determiner 21, which will also be described hereinafter. As shown in FIG. 20, only the starting time $T_s$ and the length $T_w$ are written at the stage of the CM candidate table 19a prepared by the CM candidate detector 19. Thus, the CM candidate table is used to describe and manage the starting time $T_s$ and the length $T_w$ obtained by the CM candidate detector 19, the characteristic values $Q_1$ through $Q_{11}$ computed by the additional requirement computing unit 20 and the score R and the result of score judgment Z determined by the additional requirement determiner 21. The CM candidate table is maintained until the entry is judged to be a CM or not a CM and is output as CM detection output 4a from the rule judging unit 22 if it is judged to be a CM but simply discarded if it is judged to be not a CM.

The CM candidate table 19a carrying only the starting time $T_s$ and the length $T_w$ as described by the CM is then sent to the additional requirement computing unit 20.

The additional requirement computing unit 20 extracts the characteristic values $Q_1$ through $Q_{11}$ from the candidate sections entered to the CM candidate table 19a, referring to the characteristic value buffer 18, in a manner as described below and adds them to the CM candidate table 19a to produce a CM candidate table 20a, which is then output to the additional requirement judging unit 21.

FIG. 21 schematically illustrates how the characteristic values $Q_1$ through $Q_{11}$ are computationally determined by the additional requirement computing unit 20.

Referring to FIG. 21, the horizontal axes represent the frame number (corresponding to the discrete time). In FIG. 21, (a) shows the cut change detection output C[n] and (b) shows the discretized numerical value B[n] of the broadcast mode signal 2c, whereas (c) shows the short period discrete spectrum S[k,n] of the audio signal and (d)shows the root-mean-square amplitude A[n] of the audio signal. The part indicated by $n_1$ (the part between the dotted lines) in FIG. 21 shows a CM candidate. In (a) of FIG. 21, the position indicated by CT shows the position where the cut change detection output C[n] is found to be equal to 1 (and hence where a cut change is detected). In (b) of FIG. 21, the part M indicates that it is in a broadcasting mode of some sort or another. In (c) of FIG. 21, S1, S2, S3 and S4 indicate that a spectrum component of some sort or another is there. In (d) of FIG. 21, AM indicates a change in the square-root amplitude and $Q_1$ through $Q_{11}$ indicates the respective positions where the characteristic values $Q_1$ through $Q_{11}$ are computationally determined by the additional requirement computing unit 20.

Now, each of the characteristic values $Q_1$ through $Q_{11}$ that are computationally determined by the additional requirement computing unit 20 will be described below.

The characteristic value $Q_1$ is the front break length, or the length of the low sound level section (to be referred to as "front break section") located immediately before a CM candidate section, where A[n] is successively less than a predetermined threshold value $A_{thsd}$. In FIG. 21, the section between the corresponding dotted broken lines represents the front break length $Q_1$.

The characteristic value $Q_2$ is the rear break length, or the length of the low sound level section (to be referred to as "rear break section") located immediately after a CM candidate section, where A[n] is successively less than a predetermined threshold value $A_{thsd}$. In FIG. 21, the section between the corresponding dotted broken lines represents the rear break length $Q_2$.

The characteristic value $Q_3$ is the front break minimal amplitude. The front break minimal amplitude $Q_3$ is the smallest value of A[n] in the front break section.

The characteristic values $Q_4$ is the rear break minimal amplitude. The rear break minimal amplitude $Q_4$ is the smallest value of A[n] in the rear break section.

The characteristic value $Q_5$ is the left/right correlation value. The left/right correlation value $Q_5$ is that of the 2-channel audio signals $S_L[m]$ and $S_R[m]$ for left and right. They can be computationally determined by using formula (25) below and $A_{LR}[n]$, $A_{LL}[n]$ and $A_{RR}[n]$ obtained by formulas (16) through (18).

$$Q_5 = \frac{\sum_{n=n_s}^{n_e-1} A_{LR}[n]}{\sum_{n=n_s}^{n_e-1} A_{LL}[n] \sum_{n=n_s}^{n_e-1} A_{RR}[n]} \tag{25}$$

In the computation of formula (25), the original waveform is partly added for a plurality of times as frames are made to overlap but this problem does not significantly affect the system. If the memory capacity and the processing speed are large enough for maintaining the original waveform, the operation of formula (25) can be replaced by the mutual correlation of the waveform.

The characteristic value $Q_6$ is the average amplitude. The average amplitude $Q_6$ is the RMS of the amplitudes of the audio signals (root-mean-square amplitude) of the CM candidate section. This can be obtained by using formula (26) below.

$$Q_6 = \sqrt{\frac{1}{n_e - n_s} \sum_{n=n_s}^{n_e-1} A[n]} \quad (26)$$

In the computation of formula (26), as in the case of the computation of the left/right correlation value, the original waveform is partly added for a plurality of times as frames are made to overlap but this problem does not significantly affect the system. If the memory capacity and the processing speed are large enough for maintaining the original waveform, the operation of formula (25) can be replaced by that of RMS of the original waveform.

The characteristic value $Q_7$ is the number of cuts. The number of cuts $Q_7$ is obtained by counting the number of cut changes (the number of CTs) in the CM candidate section. In other words, this is obtained by an operation of counting the number of times when $C[n] = 1$ occurs in section $[n_s, n_e)$.

The characteristic value $Q_8$ is the broadcasting mode. The broadcasting mode as used herein refers to the prevailing broadcasting mode in the CM candidate section. This is obtained by an operation of selecting the broadcasting mode $Q_8$ that appears most frequently in $B[n]$ in $[n_s, n_e)$.

The characteristic value $Q_9$ is the number of adjacent candidates. The number of adjacent candidates $Q_9$ indicates that if the sounded sections found before and after the CM candidate are also CM candidates or not. The characteristic value $Q_9$ is equal to [2] when a CM candidate is found before and after the CM candidate and [1] when a CM candidate is found only before or after the CM candidate. It is equal to [0] when no other CM candidate is found before and after the CM candidate. The operation of determining the number of adjacent candidates is realized by checking the CM candidate table. If there is a CM candidate that is immediately succeeding the CM candidate in question or not is determined by seeing if the sum of the starting time $T_s$, the length $T_w$ and the rear break length $Q_2$ or $(T_s+T_w+Q_2)$ agrees with the starting time $(T'_s)$ of some other CM candidate or not. Similarly, if there is a CM candidate that is immediately preceding the CM candidate in question or not is determined by seeing if the difference of the starting time $T_s$ and the front break length $Q_1$ or $(T_s-Q_1)$ agrees with the sum of the starting time $T'_s$ and the length $T'_w$ or $(T'_s+T'_w)$ of some other CM candidate or not.

The characteristic values $Q_{10}$ and $Q_{11}$ are the front spectrum difference energy and the rear spectrum difference energy. The front spectrum difference energy and the rear spectrum difference energy $Q_{10}$ and $Q_{11}$ are used to quantize the change in the sound quality at the boundary of a CM and the program containing the CM or at the boundary of a CM and another CM. These are defined as the square sum of the difference between the average spectrum values of the opposite sides of the boundary and obtained by using formulas (27) through (32) below;

$$S_1[k] = \frac{1}{N} \sum_{n=0}^{N-1} F[k; n'_e - n], \quad (27)$$

$$S_2[k] = \frac{1}{N} \sum_{n=0}^{N-1} F[k; n_s + n], \quad (28)$$

-continued $$S_3[k] = \frac{1}{N} \sum_{n=0}^{N-1} F[k; n_e - n], \quad (29)$$

$$S_4[k] = \frac{1}{N} \sum_{n=0}^{N-1} F[k; n'_s + n], \quad (30)$$

$$S_{10}[k] = \frac{1}{S_{norm}^2} \sum_k (S_2[k] - S_1[k])^2 \text{ and} \quad (31)$$

$$Q_{10} = \frac{1}{S_{norm}^2} \sum_k (S_4[k] - S_3[k])^2 \quad (32)$$

where N is the number of frames used for determining the average of spectrum values, $n'_e$ is the number of the ending frame of the sounded section found immediately before the CM candidate section (see FIG. 21), $n'_s$ is the number of the starting frame of the sounded section found immediately after the CM candidate section, $S_1[k]$ is the average spectrum immediately before the end of the sounded section that is found immediately before the CM candidate section, $S_2[k]$ is the average spectrum immediately after the start of the CM candidate section, $S_3[k]$ is the average spectrum immediately before the end of the CM candidate section, $S_4[k]$ is the average spectrum immediately after the start of the sounded section that is found immediately after the CM candidate section and $S_{norm}$ is an appropriate normalization constant.

The above described additional requirement computing unit 20 additionally describes the characteristic values $Q_1$ through $Q_{11}$ that are determined in a manner as described above on the CM table 19a to produce the CM candidate table 20a as output. The CM candidate table 20a is sent output the additional requirement judging unit 21.

The additional requirement judging unit 21 receives the CM candidate table 20a as input and calculates the score R for the CM candidate by performing a parameter transform on the characteristic values of the CM candidate typically, using a threshold function, and subsequently weighting the obtained values so that the CM candidate is judged to be a strong candidate when R exceeds a predetermined threshold value. The additional requirement judging unit 21 additionally describes the score R and the result of score judgment Z to the CM candidate table 20a to produce the CM candidate table 21a as output.

Figure 22:
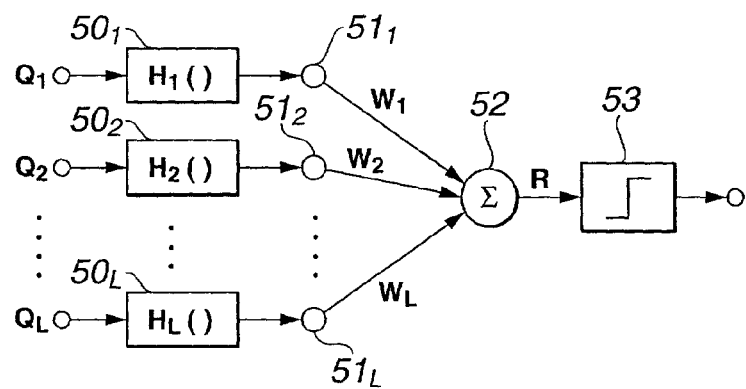
FIG. 22 is a schematic circuit diagram of the additional requirement determining computer of the embodiment.

FIG. 22 schematically illustrates the configuration of the additional requirement judging unit 21.

Referring to FIG. 22, the characteristic values $Q_1$ through $Q_L$ of the CM candidate table 21a are sent to respective function computing units $50_1$ through $50_L$, which perform transform operations by using respective parameter transform functions $H_1(\ )$ through $H_L(\ )$ and then obtain the products of the outcomes of the respective computations and respective weights $W_1$ through $W_L$ by means of respective weighting units $51_1$ through $51_L$. The characteristic values obtained as a result of the weighting operations, using the respective weighting units $51_1$ through $51_L$, are added by summation adder 52 to obtain the score R. The score R output from the summation adder 52 is compared with a predetermined threshold value by score judging unit 53 and, if the score R exceeds a predetermined threshold value, an output telling that the CM candidate is judged to be a strong CM candidate is produced. The CM candidate that is determined by the score judging unit 53 so as to be not exceeding the threshold value is erased from the table.

More specifically, the additional requirement judging unit 21 computes the score, using formula (33) below;

$$R = \sum_{l=1}^{L} W_l H_l(Q_l) \quad (33)$$

where $H_1(\ )$ is the parameter transform function predetermined for each of the characteristic values, $W_1$ is the predetermined weight and L is the number of characteristic values (=11). Note that 1 represents a number between 1 and 11.

The parameter transform function $H_1(\ )$ that is used by the function computing units $50_1$ through $50_L$ may be a rectangular function, which is the most simple function. For example, rectangular function Rect(x; $t_1$, $t_2$) as shown in (b) of FIG. 23 may be used and $t_{11}$ and $t_{21}$ may be selected for the lower and upper limits of the reference value that is predetermined for each of the characteristic values. Then, if formula (34) is used, 1 is given when $Q_1$ is found within the scope of the reference value, whereas 0 is given when $Q_1$ if found out of the scope of the reference value.

$$H_1(Q_1) = \text{Rect}(Q_1; t_1, t_2) \quad (34)$$

If a smooth transition from 0 to 1 or vice versa is to be realized near each of the boundaries, a sigmoid function Sigm(x; $t_1$, $t_2$) as expressed by formula (35) below may be used.

$$H_l(Q_l) = \text{Sigm}(Q_l; t_{1l}, t_{2l}) \quad (35)$$
$$= \frac{1}{1+\exp(-(x-t_{1l})/\sigma_{1l})} \cdot \frac{1}{1+\exp((x-t_{2l})/\sigma_{2l})}$$

Figure 23A:
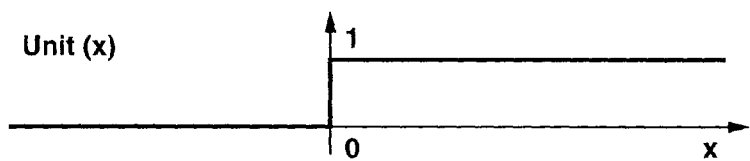
FIG. 23 is a schematic illustration of a unit step function, a rectangular function and a sigmoid type function that can be used for the operation of computationally determining scores in the embodiment.
Figure 23B:
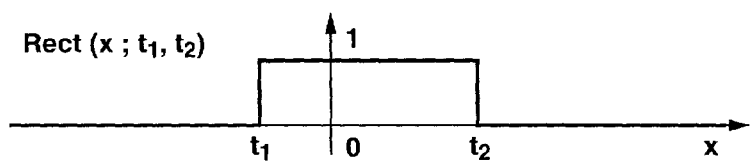
Figure 23C:
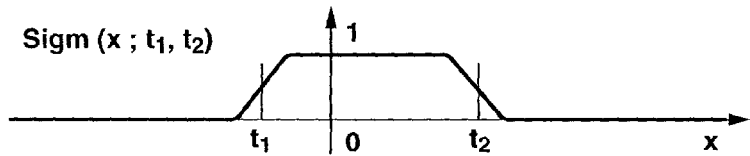

In FIG. 23, (c) schematically shows such smooth transitions. In FIG. 23, $\sigma_{11}$ and $\sigma_{21}$ are constants defining the profile of transition that are to be selected in advance typically by referring to the distribution of characteristic value.

While the weight $W_1$ applied by the weighting units $51_1$ through $51_L$ may be artificially selected in advance on the basis of the statistic properties of the characteristic values, it is also possible to select the weight by making the device learn known learning samples typically by means of a neural network (see, inter alia, Nakagawa, "Pattern Information Processing", Maruzen (1999). In formula (35), 1 represents any number between 1 and 11.

The operation of score judgment of said judging unit 53 is performed by processing the threshold value for score R, using formula (36) below;

$$Z = \text{Unit}(R - t_r) \quad (36)$$

where Unit (x) is a unit step function whose value is 1 when x>0 and 0 when x<0 as shown in (a) of FIG. 23 and t is a judgment threshold value that is predetermined or automatically selected as a result of a learning process.

Then, the rule judging unit 22 receives the CM candidate table 21a obtained as a result of the score judgment of the additional requirement judging unit 21 as input and produces the CM starting time and the CM length as final CM detection output 4a that is obtained as a result of a predetermined rule judging operation as will be described hereinafter.

That is, the rule judging unit 22 effects rule processing, thus selecting the most prominent CM candidate if there are two or more CM candidates at the same time. (The event that two or more CM candidates coexist shall be referred to as "competing relationship".)

Figure 24:
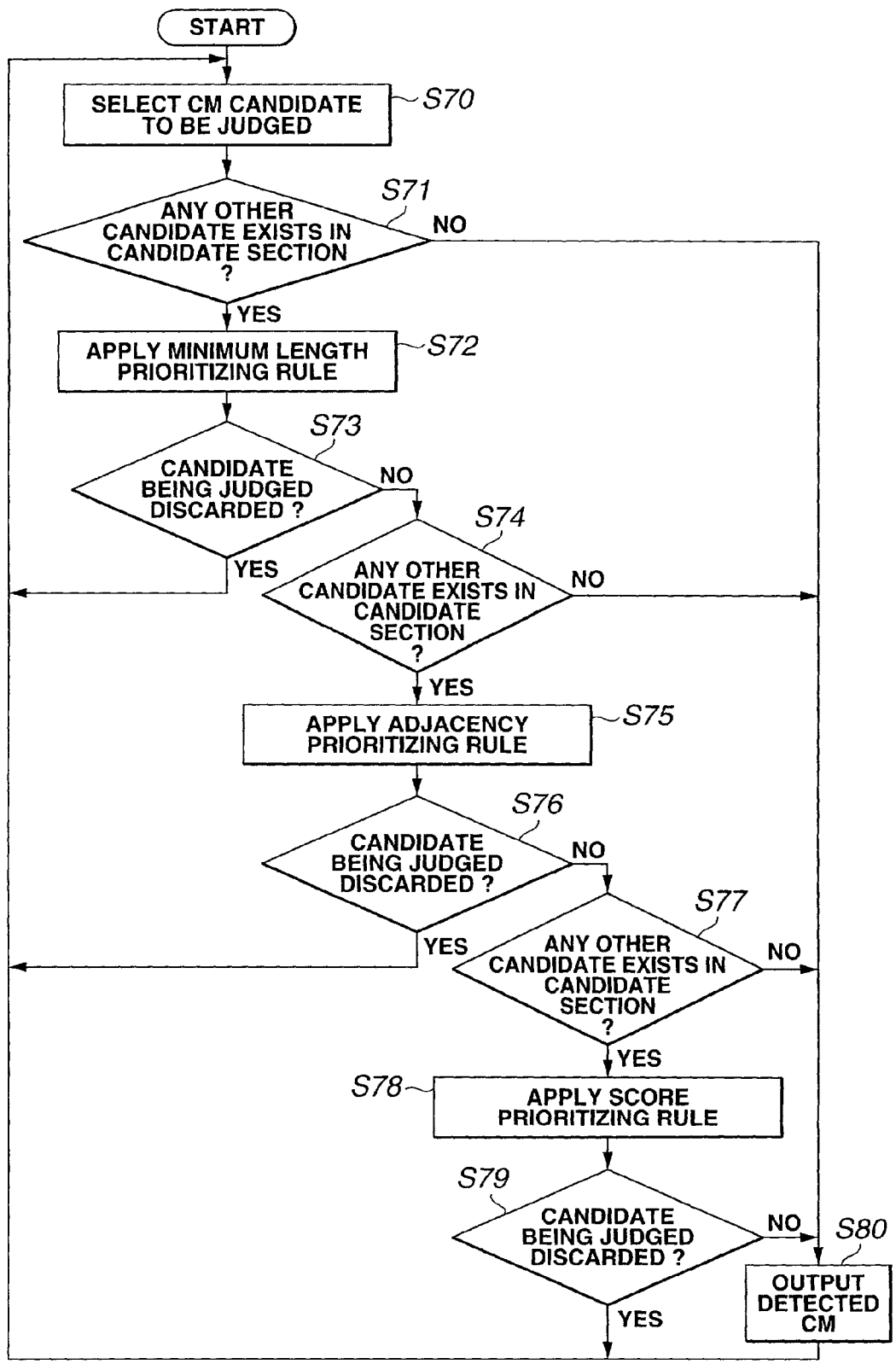
FIG. 24 is flow chart of the operation of the rule determiner of the embodiment.

Now, the operation of the rule judging unit 22 will be described by referring to the flow chart of FIG. 24.

Firstly, in Step S70, the rule judging unit 22 selects a CM candidate for judgment from the CM candidate table. The selected CM candidate is the oldest candidate in the CM candidate table that has survived for a predetermined time period $T_4$, which is long enough for containing several CMs and may typically be 150 seconds.

Subsequently, in Step S71, the rule judging unit 22 checks the CM candidate table to see if any other CM candidate is found in the selected CM candidate section (which is the period from $T_s$ to $T_s+T_w$). If it is determined in Step S71 that there is not any other CM candidate in the selected CM candidate section (No), the CM candidate is output as CM detection output and erased from the CM candidate table.

If, on the other hand, it is determined in Step S71 that there is another CM candidate in the selected CM candidate section (Yes), it is so judged that they are competing and the minimum length prioritizing rule is firstly applied to them in Step S72. With the minimum length prioritizing rule, the time section comprising a shorter CM candidate is prioritized among a number of time sections having a uniform length and comprising one or more than one CM candidates with different time lengths. More specifically, if there are a time section having a length of 30 seconds and comprising a single 30 seconds long CM candidate and a time section having a length of 30 seconds and comprising two 15 seconds long CM candidates, the 15 seconds long CM candidates are selected and the 30 seconds long CM candidate is discarded.

The minimum length prioritizing rule will be described further by referring to FIG. 25 that illustrates an example.

Figure 25:
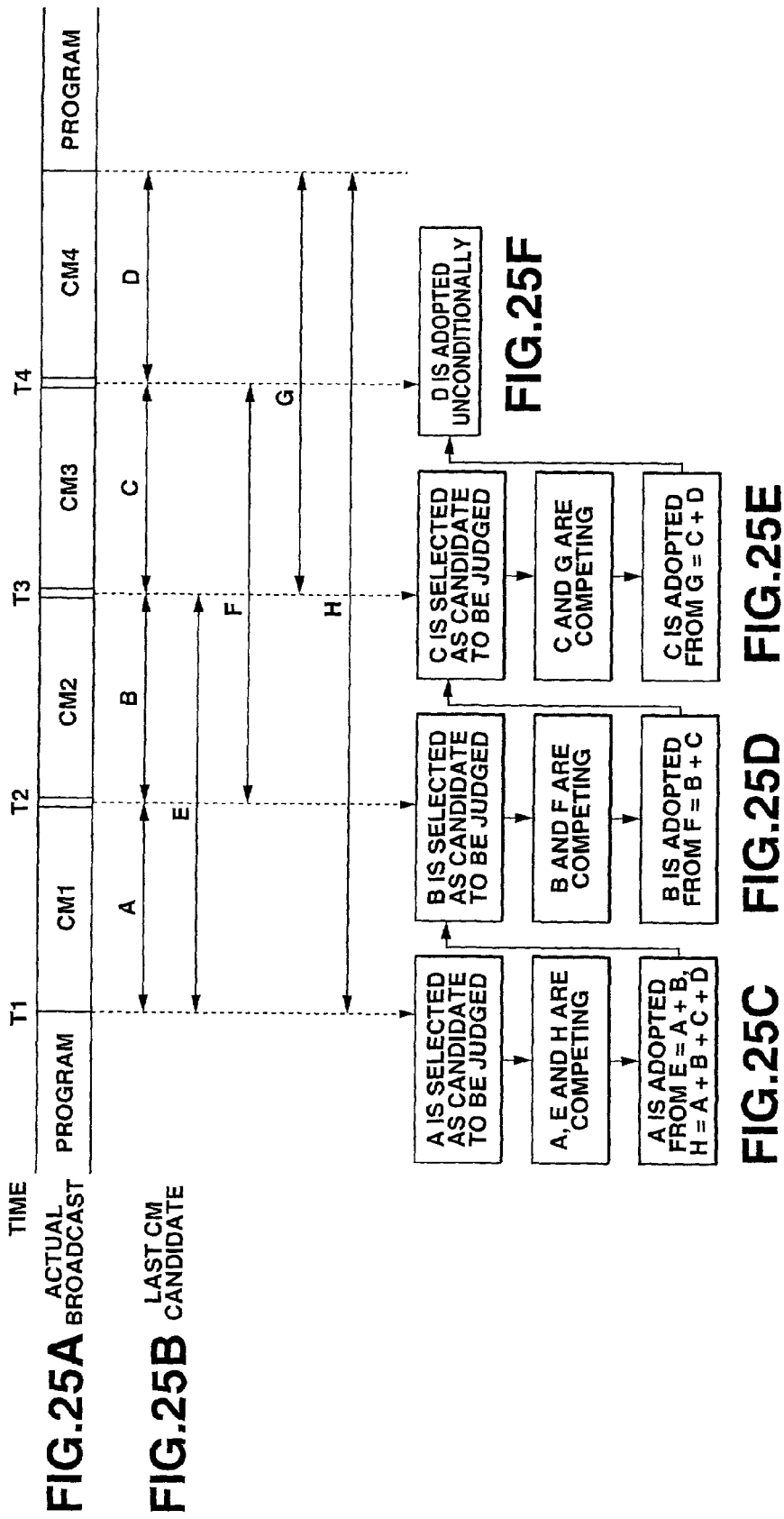
FIG. 25 is a schematic illustration of a minimum length prioritizing rule that can be used for the purpose of the invention.

In FIG. 25, (a) shows a section where four CMs including CM1 through CM4 are successively broadcast, whereas (b) shows that eight CM candidates A through H are found in the CM candidate table.

Firstly, as the CM candidate of A is subjected to judgment as shown in (c) of FIG. 25, E and H compete with A. However, since section E can be described by A and B and section H can be described by A, B, C and D, they are discarded and hence A is selected. Subsequently, as the CM candidate of B is subjected to judgment as shown in (d) of FIG. 25, F appears as competing section (note that E and H have already been discarded because A is adopted). However, since section F can be described by B and C, it is discarded and hence B is adopted. Similarly, as the CM candidate of C is subjected to judgment as shown in (e) of FIG. 25, G appears as competing section. However, since section G can be described by C and D, it is discarded and hence C is adopted. Finally, as the CM candidate of D is subjected to judgment as shown in (f) of FIG. 25, there is no longer any competitor and it is no longer necessary to apply the rule. Therefore, D is adopted.

As a result of the above operation, A, B, C and D are selected from the time section as CM candidates. If there arises a competing situation to which this rule cannot be applied, all the CM candidates are left in the table and the processing operation will simply be terminated.

Returning to FIG. 24, after the judgment in Step S72, the operation of the rule judging unit 22 proceeds to Step S73, where the rule judging unit 22 determines if the CM candidate being subjected to judgment is discarded or not as a result of the application of the minimum length prioritizing rule. If it is determined in Step S73 that the CM candidate being subjected to judgment is discarded (Yes), the rule judging unit 22 erases the candidate from the CM candidate table and returns to Step S70. If, on the other hand, it is determined in Step S73 that the CM candidate being subjected to judgment is not discarded (No), the rule judging unit 22 checks the CM candidate table in Step S74 to see if there is any other CM candidate found in the time section of the CM candidate that is being subjected to judgment.

If it is determined in Step S74 that there is not any other CM candidate (No), the rule judging unit 22 outputs the CM candidate being subjected to judgment as detection output and erase it from the CM candidate table in Step S80. If, on the other hand, it is determined in Step S74 that there is at least another CM candidate (Yes), the rule judging unit 22 proceeds to Step S75.

In Step S75, the rule judging unit 22 applies the adjacency prioritizing rule to the CM candidate. With the adjacency prioritizing rule, if there are a plurality of CM candidates that are competing with each other, priority is given to the CM candidate having adjacent CM candidates that immediately precedes and succeeds it.

Figure 26:
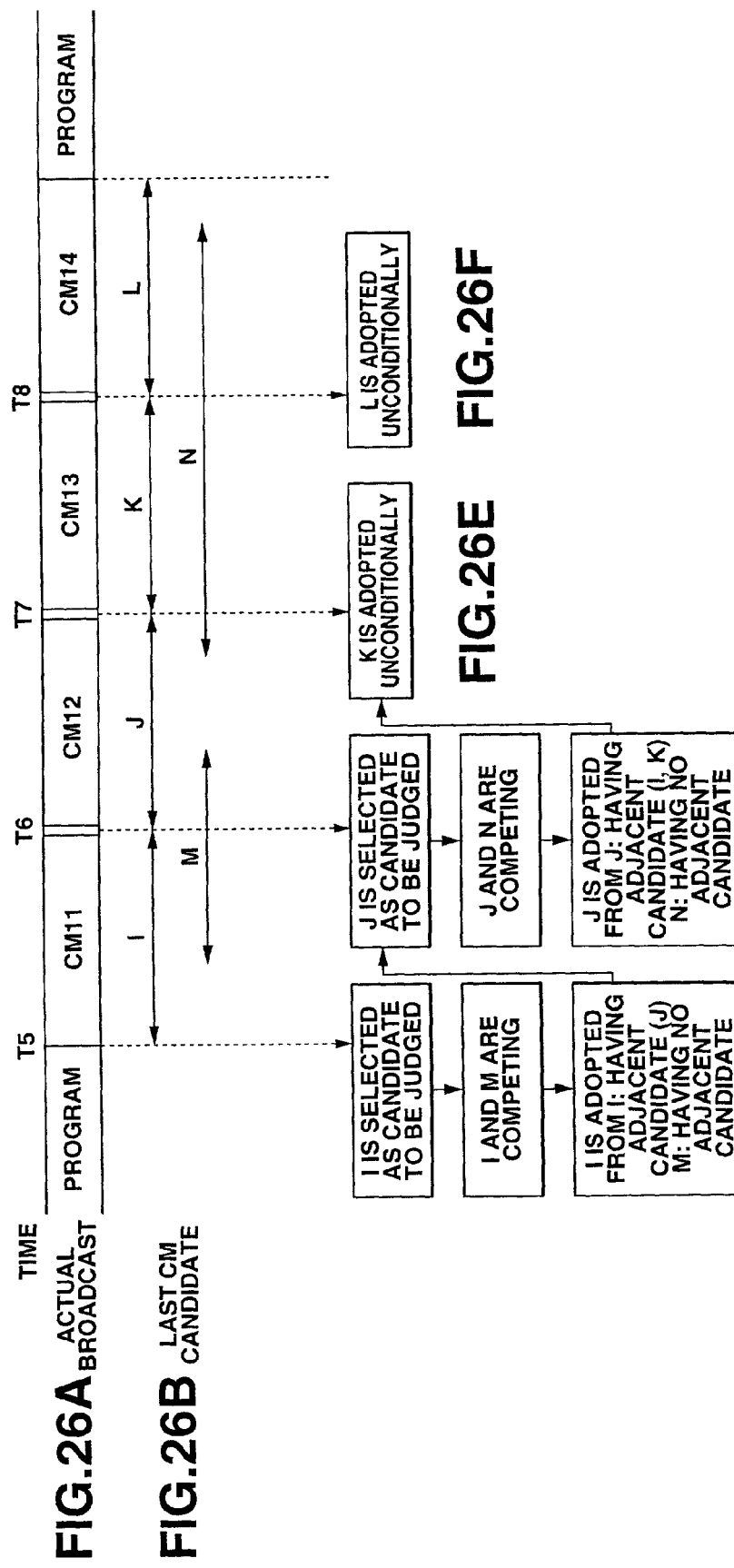
FIG. 26 is a schematic illustration of an adjacency prioritizing rule that can be used for the purpose of the invention.

The adjacency prioritizing rule will be described further by referring to FIG. 26, illustrating an example.

In FIG. 26, (a) shows that four CMs, or CM 11 through CM 14, are broadcast successively in a time section and (b) shows that there exist a total of six candidates, or candidates I through N, for the time section. The candidates M and N are selected as candidates simply because they incidently contains cut changes and low sound levels. It will be appreciated that, while such candidates are falsely selected for the time section, they survived the score judgment process for the additional requirements that is conducted to judge if the candidates are probably CMs or not because they contain CMs.

In the above example, the oldest CM candidate I is firstly subjected to judgment as shown in (c) of FIG. 26. While M competes with I, I has an adjacent candidate J but M does not have any adjacent candidate so that I is adopted and M is discarded. Then, the CM candidate J is subjected to judgment as shown in (d) of FIG. 26. While N completes with J, J has an adjacent candidate I and K but N does not have any adjacent candidate so that J is adopted and N is discarded. Subsequently, since the remaining CM candidates K, L do not have any competitor as shown in (e) and (f) of FIG. 26, both K and L are adopted without problem.

As a result of the above processing operation, I, J, K and L are selected as CM candidates from the time section of FIG. 26.

When none of the competing candidates have any adjacent candidate and when a plurality of candidates have respective adjacent candidates, none of them are discarded and left in the CM candidate table.

Returning to FIG. 24, after the operation of Step S75, the rule judging unit 22 proceeds to Step S76, where the rule judging unit 22 determines if the CM candidate being subjected to judgement is discarded or not as a result of the application of the adjacency prioritizing rule. If it is determined in Step S76 that the CM candidate being subjected to judgment is discarded (Yes), the rule judging unit 22 erases the candidate from the CM candidate table and returns to Step S70. If, on the other hand, it is determined in Step S76 that the CM candidate being subjected to judgment is not discarded (No), the rule judging unit 22 checks the CM candidate table in the next Step S77 to see if there is any other CM candidate found in the time section of the CM candidate that is being subjected to judgment.

If it is determined in Step S77 that there is not any other CM candidate (No), the rule judging unit 22 outputs the CM candidate being subjected to judgment as detection output and erase it from the CM candidate table in Step S80. If, on the other hand, it is determined in Step S77 that there is at least another CM candidate (Yes), the rule judging unit 22 proceeds to Step S78. Where the rule judging unit 22 applies the score prioritizing rule to the CM candidate. With the score prioritizing rule, if the competing situation is not dissolved as a result of the application of the above rules, the candidate having a higher score R given as a result of the score judgment of the additional requirement judging unit 21 has priority. This score prioritizing rule is repeatedly applied until the competing situation is dissolved.

Figure 27:
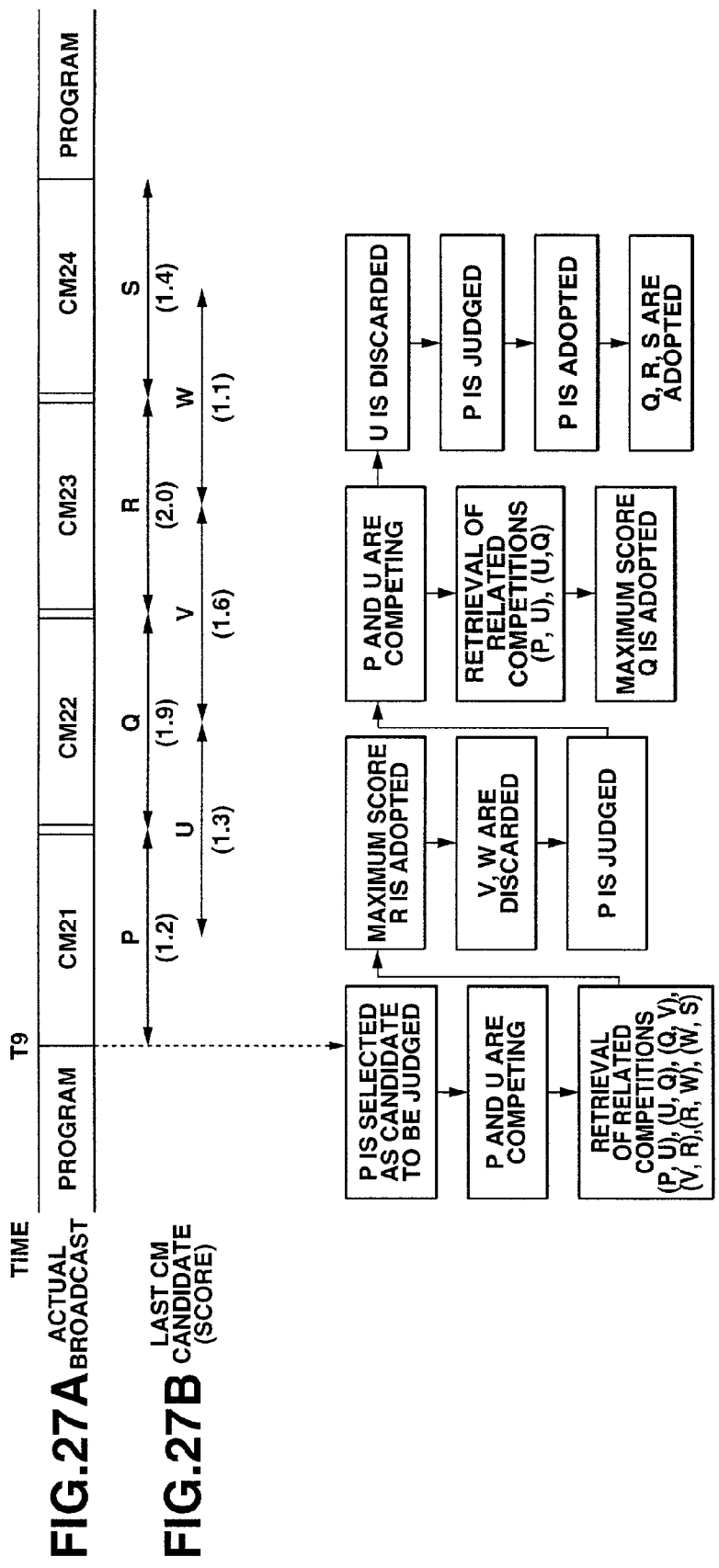
FIG. 27 is a schematic illustration of a score prioritizing rule that can be used for the purpose of the invention.

The score prioritizing rule will be described by referring to FIG. 27, illustrating an example.

In FIG. 27, (a) shows that four CMs, or CM 21 through CM 24, are broadcast successively in a time section and (b) shows that there exist a total of seven candidates, or candidates P through W, for the time section.

In the above example, the oldest CM candidate P is firstly subjected to judgment as shown in (c) of FIG. 27 and competing with U. The competing situation is not dissolved by applying the minimum length prioritizing rule and the adjacency prioritizing rule.

Therefore, all the competing situations related to the competing candidates are retrieved from the CM candidate table. Hence there are six competing situations (P-U), (U-Q), (Q-V), (V-R), (R-W) and (W-S), involving seven candidates, and the candidate having the highest score is selected by applying the score prioritizing rule. In the above example, R has the highest judgment score of (2.0) and therefore R having this score is adopted and the candidates V, W that are competing with R are discarded as shown in (d) of FIG. 27.

However, as shown in (e) of FIG. 27, the completing relationship of (P-U) is not dissolved by the above described adoption of R. Therefore, again, all the competing situations related to the competing candidates are retrieved from the CM candidate table. Since V is discarded, there are only two competing situations (P-U) and (U-Q), involving three candidates.

Of the above candidates, the candidate Q having the highest judgment score of (1.9) is adopted and the candidate U that is competing with Q is discarded as shown in (f) of FIG. 27.

With the above processing operation, there does not remain any competing situation, involving P, so that P is adopted. Additionally, U, V and W are discarded, while Q, R and S are adopted.

It will be appreciated that, if all the related competing situations are not retrieved and the score prioritizing rule is applied only to the competing situations of the candidates being judged, firstly U is adopted and P is discarded. Subsequently, because of the competing situation of U and Q, U that is once adopted is also discarded. Therefore, the rule judging unit 22 retrieves all the related competing situations in order to eliminate the risk of erroneously and incidentally discarding proper candidates because of the processing sequence that is determined only by chance.

Thus, all the competing situations of the selected candidates can be eliminated by the application of the score prioritizing rule.

Returning to FIG. 24, after the processing operation of Step S78, the rule judging unit 22 proceeds to Step S79, where the rule judging unit 22 determines if the candidates being subjected to judgement is discarded or not as a result of the application of the score prioritizing rule. If it is determined in Step S79 that the CM candidate being subjected to judgment is discarded (Yes), the rule judging unit 22 erases the candidate from the CM candidate table and returns to Step S70. If, on the other hand, it is determined in Step S79 that the CM candidate being subjected to judgment is not discarded (No), the rule judging unit 22 outputs the starting time and the length of the CM as CM detection output in Step S80 and erases the CM candidate from the CM candidate table before it returns to Step S70.

As described above, the above described first example of CM detecting section 202 of this embodiment firstly deterministically extracts CM candidates from the program on the basis of the indispensable requirements that almost all CMs satisfy, selects CM candidates by statistically evaluating the characteristic values of each CM candidate on the basis of the additional requirements that are used to indicate probable CMs and then dissolves any overlapping relationship of candidates on the basis of the logical requirement in order to accurately detect CMs. While this embodiment is adapted to a video/audio recording apparatus adapted to currently prevalent analog TV broadcasting, it will be appreciated that the CM detecting section 202 is applicable to digital TV broadcasting. It will be appreciated that, when the embodiment is applied to radio broadcasting, the part of the CM detecting section 202 for processing video signals can be omitted.

Now, a second example of CM detecting section 202 of the embodiment of the present invention will be described below.

Figure 28:
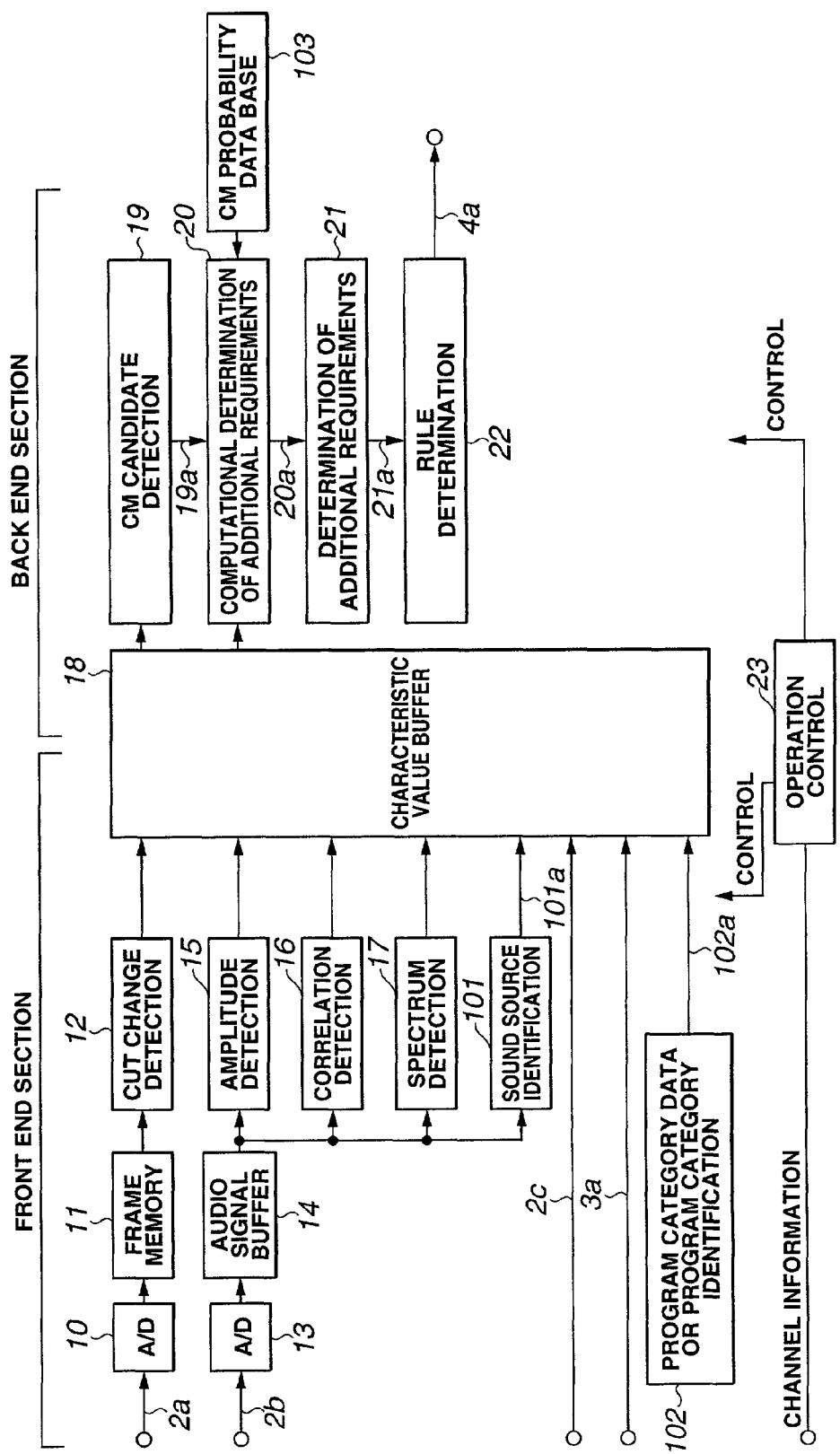
FIG. 28 is a schematic block diagram of the CM detecting section, illustrating a possible second configuration thereof.

FIG. 28 illustrates in detail the configuration of the second example of CM detecting section 202 of the embodiment of the invention.

This example of CM detecting section 202 is adapted to handle only the basic ones of the above described additional requirements. More specifically, of the additional requirements 1) through 14), 11) through 14) are not used for the CM detecting section 202 to simplify the configuration thereof. (preventing the intricacy).

Like the first example of CM detecting section 202 shown in FIG. 15, this second example of CM detecting section 202 comprises a front end section and a rear end section. In FIG. 28, the components that are same as their counterparts of FIG. 15 are denoted respectively by the same reference symbols and will not be described any further.

Referring to FIG. 28, therefore, only the additional components (101, 102, 103) and the extended function of the additional requirement computing unit 20 will be described below.

The sound source identifying unit 101 of the front end section receives a digitized and framed audio signal 2b as input and outputs the sound source name of the frame of the audio signal 2b. The sound source may be voice, music, voice and music and others. Any of the technologies illustrated in Kohchi et al., "Automatic Classification of Broadcast Sounds on the Basis of VQ distortions", Journal of the Society of Telecommunication Technology, DSP97-95/SP97-50, 43/48 (1998), Minami et al., "Video Indexing and Applications thereof Using Sound Information", Paper of the Society of Telecommunication Technology, Vol. J81-D-II, No. 3,529/537 (1998) and the specification and the drawing of Abe's Japanese Patent Application Laid-Open No. 2001-024980 may be utilized for the purpose of the identifying the sound source of the input audio signal.

A numerical value is assigned to each of the sound source names identified by the sound source identifying unit 101. The numerical values that can be used for the purpose of the invention may include voice=1 and music=2. The numerical value of each sound source is then input to the characteristic value buffer 18 as characteristic value U[n].

The program category data or the program category identifying unit 102 arranged at the front end section is used to output the category name of the program being processed. The program category names that can be used for the purpose of the invention include news, drama, baseball and soccer. Program category data may be obtained from a TV program guide or a TV program table. Nowadays, program category data can be obtained automatically by way of Internet. Alternatively, it is also possible to use a device adapted to automatically identify the category of the program being broadcast on the basis of the audio and video signals of the program without resorting to external information. The technology illustrated in the specification and the drawing of Abe's Japanese Patent Application Laid-Open No. 2001-024980 may be utilized for the purpose of the identifying the program category form the audio and video signals of the program being broadcast.

A numerical value is assigned to each of the program category names identified by the program category data or the program category identifying unit 102 on a frame by frame basis. The numerical values that can be used for the purpose of the invention may include news=1 and drama=2. The numerical value of each program category is then input to the characteristic value buffer 18 as characteristic value W[n].

Otherwise, the front end section has a configuration same as that of FIG. 15.

In the case of the above described second example, the front end section is made to comprise the sound source identifying unit 101 and the program category data or the program category identifying unit 102 so that the characteristic values U[n] and W[n] obtained by them are stored in the characteristic value buffer 18. Thus, the characteristic value G[n] of formula (21) stored in the characteristic value buffer 18 is expanded to formula (37) below.

$$G[n] \equiv \{C[n], A[n], A_{LR}[n], A_{LL}[n], A_{RR}[n], F[k;n], B[n], T[n], U[n], W[n]\} \quad (37)$$

While the rear end section of the CM detector 19 of this example is exactly same as that of FIG. 15, the CM candidate tables 19a through 21a of this second example are extended in a manner as described below. In the case of this second example, the CM candidate tables 19a through 21a are extended in such a way that the characteristic values $Q_{12}$ through $Q_{15}$ to the above described characteristic values $Q_1$ through $Q_{11}$ as shown in FIG. 29. Note that, in FIG. 29, the characteristic values $Q_1$ through $Q_{11}$ are omitted and not shown.

The CM probability data base 103 of the rear end section stores in advance the probability of transmission of each CM obtained as a function of time slot and the probability of transmission of each CM obtained as a function of program category and the elapsed time of program. The probabilities are read out from the CM probability data base 103 by referring to the current time and input to the additional requirement computing unit 20. The probability data stored in the CM probability data base 103 can be obtained by statistically processing the actually broadcast programs.

Thus, the additional requirement computing unit 20 of the second example is extended to carry out the operations of computing the characteristic values $Q_{12}$ through $Q_{15}$ to the characteristic values $Q_1$ through $Q_{11}$.

The characteristic value $Q_{12}$ is obtained by checking if the CM candidate being examined contains one or more than one voice sections or not. The characteristic value $Q_{12}$ that shows if the CM candidate contains one ore more than one voice sections or not is determined by using formula (38) below.

$$Q_{12} = \begin{cases} 1 (\text{if}^{\exists} U[n] = (\ ) \text{ or}^{\exists} U[n] = (\ ) \text{ for } n_s \leq n < n_e) \\ 0 \ (\text{otherwise}) \end{cases} \quad (38)$$

Like the presence or absence of voice, the characteristic value $Q_{13}$ is obtained by checking if the CM candidate being examined contains one or more than one music sections or not. The characteristic value $Q_{13}$ that shows if the CM candidate contains one ore more than one music sections or not is determined by using formula (39) below.

$$Q_{13} = \begin{cases} 1 (\text{if}^{\exists}\ U[n] = (\ )\ \text{or}^{\exists} U[n] = (\ )\ \text{for}\ n_s \le n < n_e) \\ 0\ (\text{otherwise}) \end{cases} \quad (39)$$

The characteristic value $Q_{14}$ is the probability of occurrence of the CM in question as determined on the basis of the current time (time slot probability). The additional requirement computing unit 20 uses the probability of broadcasting the CM obtained from the CM probability data base 103 directly as the characteristic value $Q_{14}$ The characteristic value $Q_{15}$ is the probability of occurrence of the CM in question as determined on the basis of program category of the current program and the elapsed time from the start of the program (program category probability). The additional requirement computing unit 20 uses the probability of broadcasting the CM obtained from the CM probability data base 103 directly as the characteristic value $Q_{15}$.

The arrangement of the CM detecting section 202 downstream to the additional requirement judging unit 21 is same as that the CM detecting section 202 of FIG. 15 except that the variables are extended to include the characteristic values $Q_{12}$ through $Q_{15}$ and therefore will not be described here any further.

As a result of the above described extension, the CM detecting section 202 of this example can detect CMs on the basis of the sound sources of the broadcast signal, taking the current time and the program category into consideration.

Figure 30:
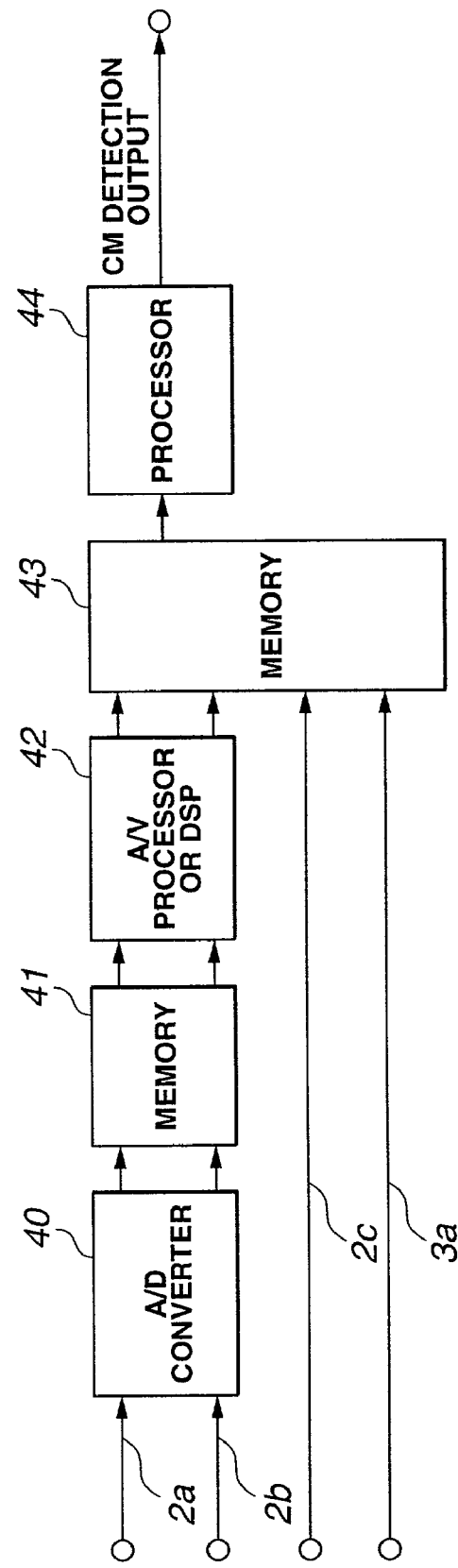
FIG. 30 is a schematic block diagram of the hardware components of the CM detection of the embodiment that can be used for the purpose of the invention.

FIG. 30 is a schematic block diagram of the hardware components of the CM detecting section 202 of the embodiment that can be used for the purpose of the invention and illustrated in FIGS. 15 and 28.

Referring to FIG. 30, the A/D converter 40 has the function of the A/D converters 10 and 13 of FIGS. 15 and 28 and the memory 41 has the function of the frame memory 11 and that of audio signal buffer 14.

The A/V processor, or DSP (digital signal processor) 42 has the functions of the cut change detector 112, the amplitude detector 15, the correlation detector 16, the spectrum detector 17, the sound source identifier 101 and so on and the memory 43 has the function of the characteristic value buffer 18.

The processor 44 has functions of the CM candidate detector 19, the additional requirement computing unit 20, the additional requirement judging unit 21, the rule judging unit 22, the CM probability data base 103 and so on.

Either the A/V processor, or the DSP (digital signal processor) 42 or the processor 44 may be made to have the function of the operation control section 23.

What is claimed is:

1. A signal processing device comprising:
commercial message section detecting means for detecting a commercial message section in an input signal including at least the commercial message section and remaining signal section on a time division basis, wherein a start time of a commercial message and a length of the commercial message section are detected by the commercial message section detecting means;
a commercial message extracting means for extracting the commercial message in the commercial message section from the input signal in accordance with a result of the detection by the commercial message section detecting means, the commercial message being extracted for subsequent access by a user, the access including play back of the commercial message in response to a user selection;
a recording means for recording each commercial message for subsequent access by the user in response to the user selection;
an index information extracting means for extracting information from said commercial message section to be used as a user-selectable index representing said recorded commercial message, the information extracted from said commercial message section and associated with said commercial message being one of a starting image, a cut point image, a starting sound or an ending sound; and
a display means for displaying said index, the display means further playing back a selected commercial message audibly and/or visually in response to a user selection from the index, the index including a plurality of commercial messages recorded by the recording means that are selectable by the user for playback.

2. The signal processing device according to claim 1, further comprising a characteristic value extracting means for extracting a characteristic value characterizing the commercial message from the detected commercial message section, wherein said recording means records each characteristic value of the commercial message in association with the commercial message.

3. The signal processing device according to claim 1, wherein said commercial message section detecting means detects said commercial message section from said input signal on the basis of a characteristic pattern of the commercial message appearing in said input signal at predetermined time intervals and a characteristic value reflecting the probability of the commercial message appearing in the input signal.

4. The signal processing device according to claim 1, wherein said commercial message section detecting means detects said commercial message section on the basis of predetermined guide information which is prepared corresponding to said input signal.

5. The signal processing device according to claim 2, wherein said characteristic value characterizing said commercial message is amplitude of the signal in the commercial message section.

6. The signal processing device according to claim 2, wherein said characteristic value characterizing said commercial message is a spectrum of the signal in the commercial message section.

7. The signal processing device according to claim 2, wherein said characteristic value characterizing said commercial message is a linear prediction coefficient of the signal in the commercial message section.

8. The signal processing device according to claim 2, wherein said characteristic value characterizing said commercial message is a histogram of a predetermined component of the signal in the commercial message section.

9. The signal processing device according to claim 2, wherein said characteristic value characterizing said commercial message is a mean value of a predetermined component of the signal in the commercial message section.

10. The signal processing device according to claim 2, wherein said characteristic value characterizing said commercial message is a difference between two predetermined signal components of the commercial message in the commercial message section.

11. The signal processing device according to claim 2, wherein said characteristic value characterizing said commercial message is the number of changes of the state of the signal in the commercial message section.

12. The signal processing device according to claim 2, wherein said characteristic value characterizing said commercial message is the time of the change of the state of the signal in the commercial message section.

13. The signal processing device according to claim 1, wherein said index is an edited signal obtained by editing said commercial message.

14. The signal processing device according to claim 13, wherein said edited signal obtained by editing said commercial message comprises a set of signals at the time when the state of said commercial message changes.

15. The signal processing device according to claim 13, wherein said edited signal obtained by editing said commercial message comprises a signal representing one of a starting part of said commercial message and an ending part of said commercial message.

16. The signal processing device according to claim 1, wherein said index information extracting means extracts for the index a portion of the commercial message at a time when the state of said commercial message changes.

17. The signal processing device according to claim 2, further comprising a comparing means for comparing the characteristic values respectively characterizing two commercial messages recorded by said recording means and discarding one of the recorded two commercial messages when the characteristic values of the two commercial messages are determined to be substantially the same.

18. The signal processing device according to claim 17, wherein said comparing means detects agreement/disagreement of the two commercial messages in a part of the commercial message section or in the entire commercial message section by comparing said characteristic values.

19. The signal processing device according to claim 17, wherein said comparing means detects the degree of similarity of the two commercial messages in a part of the commercial message section or in the entire commercial message section by comparing said characteristic values.

20. The signal processing device according to claim 17, wherein said comparing means performs the comparing operation on a basis of a distance as determined by using a predetermined distance scale between vectors corresponding to the two commercial messages, the respective vector of each of the two commercial messages formed from at least one of the amplitude of the signal in the commercial message section, the spectrum of the signal in the commercial message section, the linear prediction coefficient of the signal in the commercial message section, the histogram of a predetermined component of the signal in the commercial message section, the mean value of the predetermined component of the signal in the commercial message section, a difference between two predetermined signal components of the signal in the commercial message section, the number of changes in the state of the signal in the commercial message section and the time of a change in the state of the signal in the commercial message section.

21. The signal processing device according to claim 1, wherein said user-selectable index is one of a plurality of user-selectable indices each of which correspond to an extracted signal from said input signal, said display means displays each of said indices, and further comprising:

an index information selecting means for selecting one index from said displayed plurality of indices; and
a retrieving means for retrieving one of the recorded extracted signals corresponding to said selected one index.

22. The signal processing device according to claim 2, further comprising:
a retrieving means for retrieving one of the recorded extracted signals substantially agreeing with said commercial message from said recording means, using said commercial message in a part of the section or in the entire section or a characteristic value characterizing the commercial message as a retrieving condition.

23. The signal processing device according to claim 2, further comprising:
a retrieving means for retrieving one of the recorded extracted signals substantially agreeing with said commercial message from said recording means, using a part or all of said commercial message or a characteristic value characterizing the commercial message as retrieving condition.

24. The signal processing device according to claim 1, further comprising:
a measuring means for measuring the number of times and/or the hours of appearances of a same commercial message.

25. The signal processing device according to claim 1, further comprising:
a measuring means for measuring the number of times and/or the hours of appearances of similar commercial messages.

26. A signal processing method comprising the steps of:
detecting a commercial message section in an input signal containing at least the commercial message section and the remaining signal section on a time division basis;
extracting a commercial message of the commercial message section from the input signal in accordance with the result of the detection of the commercial message section, the commercial message being extracted for subsequent access by a user;
recording each commercial message extracted for subsequent access by the user in response to the user selection;
extracting information from said commercial message section to be used as a user-selectable index representing said recorded commercial message, the information extracted from said commercial message section and associated with said commercial message being one of a starting image, a cut point image, a starting sound or an ending sound; and
displaying said index to the user in order to receive the user selection, the index including a plurality of commercial messages that were previously recorded and are selectable by the user for playback;
playing back a selected commercial message that was previously recorded from the index in response to a user selection of the selected commercial message from the index, the selected commercial message being enabled to be played back audibly, audibly and visually, or visually.

27. The signal processing method according to claim 26, further comprising the steps of:
extracting a characteristic values characterizing the commercial message from the detected commercial message section;
determining a start time of the commercial message and a length of the commercial message section; and each characteristic values of the commercial message in association with the commercial message, wherein the characteristic values include a amplitude characterizing value, a spectrum characterizing value, a linear prediction coefficient, a brightness histogram, a color histogram, an average luminance of a luminance difference energy, and a number of cut changes.

28. The signal processing method according to claim 26, wherein said commercial message section detecting step is adapted to detect said commercial message section from said input signal on the basis of a characteristic pattern of the commercial message appearing in said input signal at predetermined time intervals and a characteristic value reflecting the probability of the commercial message appearing in the input signal.

29. The signal processing method according to claim 26, wherein
said commercial message section detecting step comprises detecting said commercial message section on a basis of predetermined guide information which is prepared to correspond to said input signal.

30. The signal processing method according to claim 27, wherein said characteristic value characterizing said commercial message is amplitude of the signal in the commercial message section.

31. The signal processing method according to claim 27, wherein said characteristic value characterizing said commercial message is a spectrum of the signal in the commercial message section.

32. The signal processing method according to claim 27, wherein said characteristic value characterizing said commercial message is a linear prediction coefficient of the signal in the commercial message section.

33. The signal processing method according to claim 27, wherein said characteristic value characterizing said commercial message is a histogram of a predetermined component of the signal in the commercial message section.

34. The signal processing method according to claim 27, wherein said characteristic value characterizing said commercial message is a mean value of a predetermined component of the signal in the commercial message section.

35. The signal processing method according to claim 27, wherein said characteristic value characterizing said commercial message is a difference between two predetermined signal components of the commercial message in the commercial message section.

36. The signal processing method according to claim 27, wherein said characteristic value characterizing said commercial message is the number of changes of the state of the signal in the commercial message section.

37. The signal processing method according to claim 27, wherein said characteristic value characterizing said commercial message is the time of the change of the state of the signal in the commercial message section.

38. The signal processing method according to claim 26, wherein said index is an edited signal obtained by editing said commercial message.

39. The signal processing method according to claim 38, wherein said edited signal obtained by editing said commercial message comprises a set of signals at the time when the state of said commercial message changes.

40. The signal processing method according to claim 38, wherein said edited signal obtained by editing said commercial message comprises a signal representing one of a starting part of said commercial message and an ending part of said commercial message.

41. The signal processing method according to claim 26, wherein said index information extracting step-comprises extracting as the index a portion of the commercial message at a time when the state of said commercial message changes.

42. The signal processing method according to claim 27, further comprising comparing the characteristic values respectively characterizing two commercial messages recorded by said recording means and discarding one of the recorded two commercial messages when the characteristic values of the two commercial messages are determined to be substantially the same.

43. The signal processing method according to claim 42, wherein said comparing step is adapted to detect the agreement/disagreement of the two commercial messages in a part of the commercial message section or in the entire commercial message section by comparing said characteristic values.

44. The signal processing method according to claim 42, wherein said comparing step is adapted to detect the degree of similarity of the two commercial messages in a part of the commercial message section or in the entire commercial message section by comparing said characteristic values.

45. The signal processing method according to claim 42, wherein said comparing step comprises comparing the characteristic values respectively characterizing the two commercial messages on the basis of the distance as determined by using a predetermined distance scale between vectors corresponding to the two commercial messages, the respective vector of each of the two commercial messages formed from at least one of the amplitude of the signal in the commercial message section, the spectrum of the signal in the commercial message section, the linear prediction coefficient of the signal in the commercial message section, the histogram of a predetermined component of the signal in the commercial message section, the average value of a predetermined component of the signal in the commercial message section, a difference between two predetermined signal components of the signal in the commercial message section, the number of changes in the state of the signal in the commercial message section and the time of a change in the state of the signal in the commercial message section.

46. The signal processing method according to claim 26, wherein said user-selectable index is one of a plurality of user-selectable indices each of which correspond to an extracted signal from said input signal, said display means displays each of said indices, and further comprising selecting one index from said displayed plurality indices; and retrieving one of the recorded extracted signals corresponding to said selected one index.

47. The signal processing method according to claim 27, further comprising a retrieving step for retrieving one of the recorded extracted signals substantially agreeing with said commercial message from said recording step, using said commercial message in a part of the section or in the entire section or a characteristic value characterizing the commercial message as a retrieving condition.

48. The signal processing method according to claim 27, further comprising a retrieving step for retrieving one of the recorded extracted signals substantially agreeing with said commercial message from said recording step, using a part or all of said commercial message or a characteristic value characterizing the commercial message as a retrieving condition.

49. The signal processing method according to claim 26, further comprising a measuring step for measuring the number of times and/or the hours of appearances of a same commercial message.

50. The signal processing method according to claim 26, further comprising a measuring step for measuring the number of times and/or the hours of appearances of similar commercial messages.

51. The signal processing device according to claim 1, wherein said input signal comprises a video signal and/or an audio signal and said commercial message covers a commercial message section.

52. The signal processing method according to claim 26, wherein said input signal comprises a video signal and/or an audio signal and said commercial message covers a commercial message section.

53. A signal processing device comprising:
- a first signal section detecting means for detecting a first signal section in an input signal including at least the first signal section and the remaining signal section on a time division basis;
- a first signal extracting means for extracting a first signal in the first signal section from the input signal in accordance with a result of the detection by the first signal section, the first signal being extracted for subsequent play back by a user;
- a recording means for recording each signal extracted from the input signal by the first signal extracting means for subsequent playback by the user, wherein said recording means includes a characteristic comparing means for comparing the first signal with each signal stored in the recording means and, in response to determining that the first signal is the same as another signal stored in the recording means, removing from the recording means one of the first signal or the other signal;
- a characteristic value extracting means for extracting a characteristic value characterizing the first signal from the first signal section, wherein said, recording means records each characteristic value of the first signal, wherein the characteristic value includes any of a amplitude characterizing value, a spectrum characterizing value, a linear prediction coefficient, a brightness histogram, a color histogram, an average luminance of a luminance difference energy, and a number of cut changes;
- an index information extracting means for extracting information from said first signal section to be used as a user-selectable index representing said recorded first signal, the index including a plurality of signals that are selectable for playback; and
- a display means for displaying said index, the display means further playing back a selected signal audibly and/or visually in response to a user selection from the user-selectable index.

* * * * *